(12) United States Patent
Taniguchi et al.

(10) Patent No.: US 10,676,082 B2
(45) Date of Patent: Jun. 9, 2020

(54) PARKING ASSISTANCE METHOD AND PARKING ASSISTANCE DEVICE

(71) Applicant: Nissan Motor Co., Ltd., Yokohama-shi, Kanagawa (JP)

(72) Inventors: Yohei Taniguchi, Kanagawa (JP); Yasuhisa Hayakawa, Kanagawa (JP); Yasuhiro Suzuki, Kanagawa (JP); Ichiro Yamaguchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/330,032

(22) PCT Filed: Sep. 6, 2016

(86) PCT No.: PCT/JP2016/076169
§ 371 (c)(1),
(2) Date: Mar. 1, 2019

(87) PCT Pub. No.: WO2018/047231
PCT Pub. Date: Mar. 15, 2018

(65) Prior Publication Data
US 2019/0202447 A1    Jul. 4, 2019

(51) Int. Cl.
*B60W 30/06* (2006.01)
*B60R 21/00* (2006.01)
*G05D 1/00* (2006.01)

(52) U.S. Cl.
CPC ............ *B60W 30/06* (2013.01); *B60R 21/00* (2013.01); *G05D 1/00* (2013.01); *G05D 1/0022* (2013.01);

(Continued)

(58) Field of Classification Search
None
See application file for complete search history.

(56) References Cited

U.S. PATENT DOCUMENTS

2011/0301786 A1\* 12/2011 Allis .................... G05D 1/0038
                                                    701/2
2015/0375741 A1    12/2015 Kiriya

FOREIGN PATENT DOCUMENTS

JP        H04-353349 A     12/1992
JP        2006224778 A      8/2006
(Continued)

*Primary Examiner* — Richard M Camby
(74) *Attorney, Agent, or Firm* — Young Basile Hanlon & MacFarlane, P.C.

(57) ABSTRACT

A parking assistance method including: setting a target parking position of a vehicle on the basis of a circumferential situation of the vehicle detected by a circumferential situation detection sensor; determining a communication situation between an operation device configured to receive an operation by an operator outside the vehicle and transmit an instruction signal corresponding to the operation and a communication device mounted on the vehicle and configured to receive the instruction signal; limiting the operation for manually adjusting the target parking position in the operation device depending on the communication situation; transmitting, when the target parking position is adjusted, the instruction signal for moving the target parking position to the communication device; and parking the vehicle by the automatic driving in the target parking position moved depending on the instruction signal received at the communication device.

13 Claims, 16 Drawing Sheets

(52) U.S. Cl.
CPC ....... *G05D 1/0038* (2013.01); *B60W 2554/00* (2020.02)

(56) References Cited

FOREIGN PATENT DOCUMENTS

| | | | |
|---|---|---|---|
| JP | 2006306233 | A | 11/2006 |
| JP | 2009271760 | A | 11/2009 |
| JP | 2014065392 | A | 4/2014 |
| JP | 2014109940 | A | 6/2014 |
| JP | 2015089733 | A | 5/2015 |
| JP | 2015191249 | A | 11/2015 |
| JP | 2016007959 | A | 1/2016 |
| WO | 2015068032 | A1 | 5/2015 |

* cited by examiner

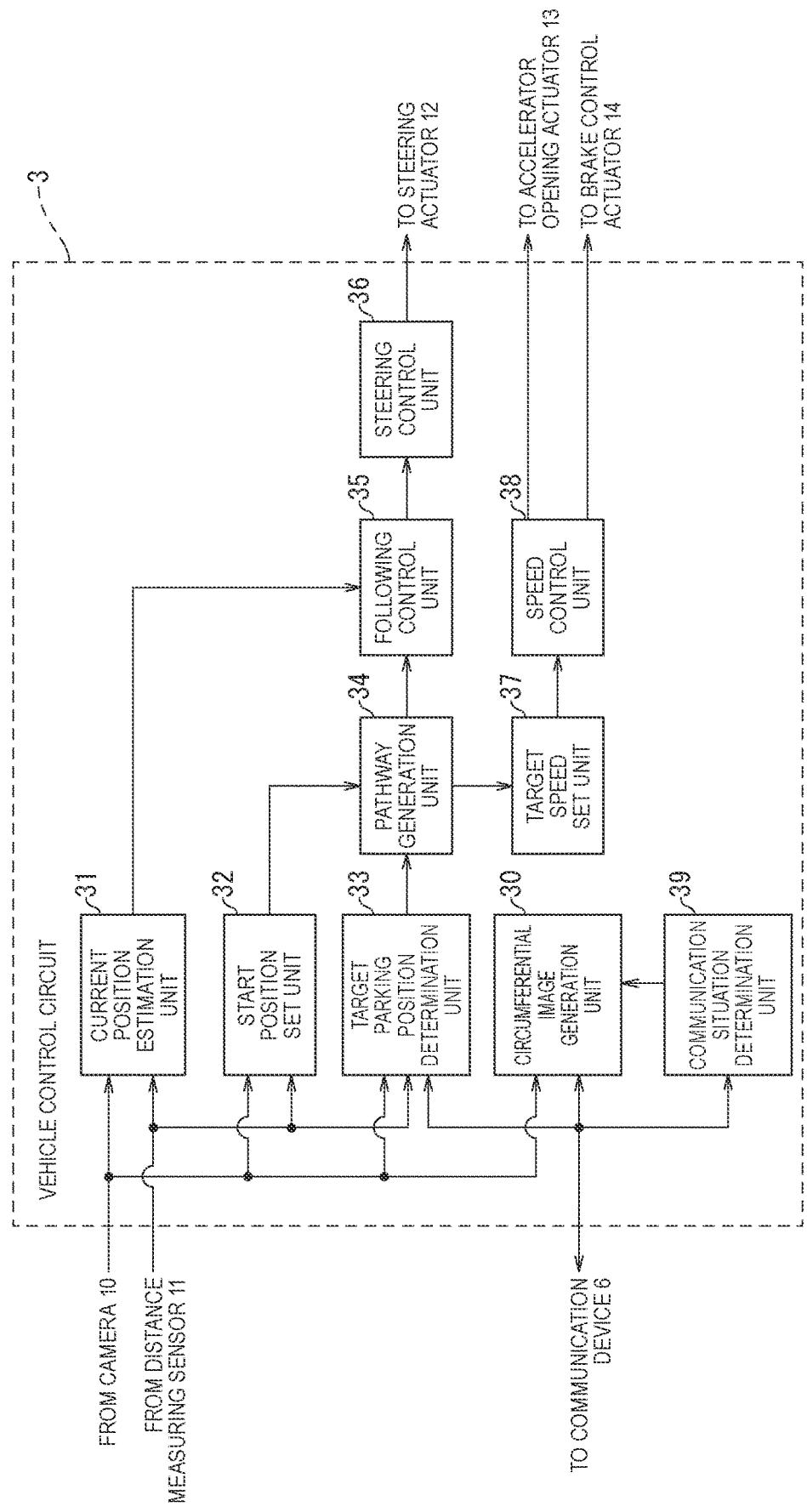

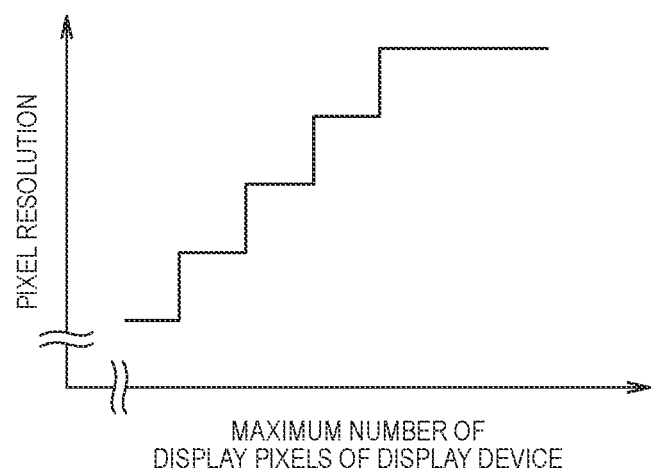

PARKING ASSISTANCE METHOD AND PARKING ASSISTANCE DEVICE

TECHNICAL FIELD

The present invention relates to a parking assistance method and a parking assistance device.

BACKGROUND

A technology for adjusting a parking position using a remote operation device outside a vehicle interior is described in Japanese Patent Application Publication No. JP 2006-306233 A.

When a communication situation between an operation device existing outside a vehicle and the vehicle is bad, a communication speed between the operation device and the vehicle decreases. Thus, the operability of the operation device sometimes decreases due to the decrease in the communication speed. The foregoing decrease in the operability of the operation device is generated because arrival of an instruction signal corresponding to an operation performed in the operation device is delayed due to the decrease in the communication speed, for example.

For example, when the arrival of the instruction signal is delayed, the responsiveness for the operation performed in the operation device decreases. Thus, an operator mistakenly believes that the operation is not received, and sometimes repeats the same operation. Consequently, an excessive operation is performed, thereby leading to a result that the operator does not intend, and the operator feels unhandiness of the operation device.

As just described, the decrease in the operability of the operation device possibly provides a feeling of discomfort for the operator.

An object of the present invention is, when a target parking position is manually adjusted in an operation device configured to park a vehicle by a remote operation, to reduce a feeling of discomfort that an operator feels due to a decrease in operability of the operation device in association with deterioration in a communication situation between the operation device and the vehicle.

SUMMARY

According to one aspect of the present invention, there is provided a parking assistance method for receiving an operation by an operator from outside of a vehicle and executing automatic parking in a target parking position, the parking assistance method including: determining a communication situation between an operation device configured to receive the operation and transmit an instruction signal corresponding to the operation and a communication device mounted on the vehicle and configured to receive the instruction signal; and limiting an operation for manually adjusting the target parking position in the operation device depending on the communication situation.

BRIEF DESCRIPTION OF THE DRAWINGS

FIG. 2 is a block diagram illustrating an example of a functional configuration of a vehicle control circuit;

FIG. 13 is an explanatory diagram of a second setting example of the pixel resolution of the second circumferential image to be transmitted to the operation device from the vehicle;

DETAILED DESCRIPTION

Hereinafter, embodiments of the present invention will be described with reference to the drawings.

First Embodiment (Configuration)

Figure 1:
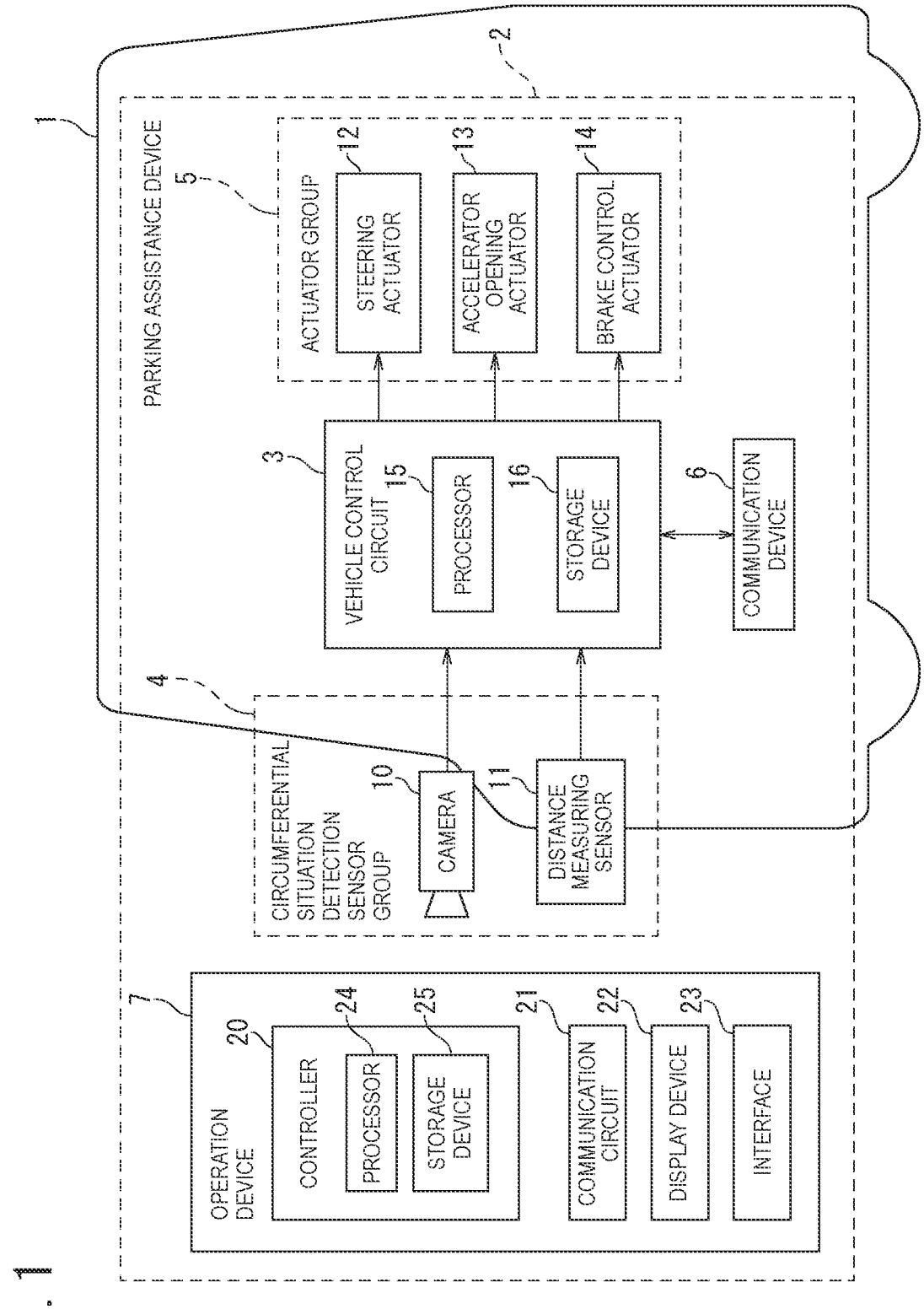
FIG. 1 is a diagram illustrating a configuration example of a vehicle including a parking assistance device according to embodiments.

Refer to FIG. 1. A parking assistance device 2 configured to park a vehicle 1 in a target parking position by automatic driving includes a vehicle control circuit 3, a circumferential situation detection sensor group 4, an actuator group 5, a communication device 6, and an operation device 7. The vehicle control circuit 3, the circumferential situation detection sensor group 4, the actuator group 5, and the communication device 6 are mounted on the vehicle 1.

A driver (i.e. an operator of the operation device 7) can operate the vehicle control circuit 3 by operating the operation device 7 outside the vehicle 1.

In the circumferential situation detection sensor group 4, a sensor for detecting a circumferential situation of the vehicle 1 necessary for the automatic driving of the vehicle 1 by the parking assistance device 2 is included. The circumferential situation detection sensor group 4 includes a camera 10 and a distance measuring sensor 11. The camera 10 detects a circumferential situation of the vehicle 1, such as a relative position between the vehicle and another vehicle, a distance between the vehicle and another vehicle, an obstacle existing in the circumference of the vehicle, and a white line on a road in the circumference of the vehicle. In addition, the distance measuring sensor 11 detects a circumferential situation of the vehicle 1, such as a relative position between the vehicle and another vehicle, a distance between the vehicle and another vehicle, and an obstacle existing in the circumference of the vehicle. For example, the distance measuring sensor 11 may be a laser range finder or a sonar. The camera 10 and the distance measuring sensor 11 output information of the detected circumferential situation to the vehicle control circuit 3.

The vehicle control circuit 3 is an electronic control unit configured to perform automatic driving control of the vehicle. The vehicle control circuit 3 includes a processor 15 and a peripheral component, such as a storage device 16.

The processor 15 may be a CPU (Central Processing Unit) or a MPU (Micro-Processing Unit), for example.

The storage device 16 may include any of a semiconductor storage device, a magnetic storage device, and an optical storage device. The storage device 16 may include a memory, such as a ROM (Read Only Memory) and a RAM (Random Access Memory), which is used as a register, a cache memory, or a main storage device.

It is to be noted that the vehicle control circuit 3 may be achieved by a functional logic circuit set in a general-purpose semiconductor integrated circuit. For example, the vehicle control circuit 3 may have a programmable logic device (PLD), such as a field-programmable gate array (FPGA), or the like.

The vehicle control circuit 3 determines the target parking position on the basis of the circumferential situation detected by the circumferential situation detection sensor group 4 and the operation of the operation device 7 by the driver. The vehicle control circuit 3 drives the actuator group 5 such that the vehicle 1 is parked in the determined target parking position.

The actuator group 5 operates a steering wheel, an accelerator opening, and a brake device of the vehicle in response to a control signal from the vehicle control circuit 3 to generate a vehicle behavior of the vehicle. The actuator group 5 includes a steering actuator 12, an accelerator opening actuator 13, and a brake control actuator 14. The steering actuator 12 controls a steering direction and the amount of steering of the steering wheel of the vehicle. The accelerator opening actuator 13 controls the accelerator opening of the vehicle. The brake control actuator 14 controls a braking operation of the brake device of the vehicle. It is to be noted that a shift actuator may be included in the actuator group 5. The shift actuator controls a shift of the vehicle, switches moving forward and moving backward, and controls a switch to parking.

The communication device 6 performs communication with the operation device 7 via a wire or wireless communication line. The communication device 6 is connected to the vehicle control circuit 3 and enables communication with the vehicle control circuit 3 and the operation device 7. The communication device 6 may perform communication with the operation device 7 via, for example, Near Field Communication, such as Bluetooth (registered trademark), wireless LAN (Local Area Network), such as Wi-Fi (registered trademark), and public wireless communication. The communication device 6 receives an instruction signal corresponding to the operation performed by the driver in the operation device 7 from the operation device 7.

A functional configuration of the vehicle control circuit 3 will be described with reference to FIG. 2. The vehicle control circuit 3 includes a circumferential image generation unit 30, a current position estimation unit 31, a start position set unit 32, a target parking position determination unit 33, a pathway generation unit 34, a following control unit 35, a steering control unit 36, a target speed set unit 37, a speed control unit 38, and a communication situation determination unit 39.

By executing a computer program stored in the storage device 16, the processor 15 of the vehicle control circuit 3 achieves functions of the circumferential image generation unit 30, the current position estimation unit 31, the start position set unit 32, the target parking position determination unit 33, the pathway generation unit 34, the following control unit 35, the steering control unit 36, the target speed set unit 37, the speed control unit 38, and the communication situation determination unit 39.

The circumferential image generation unit 30 generates a circumferential image of the vehicle 1 on the basis of an image signal obtained by photographing the circumference of the vehicle 1 with the camera 10. For example, the circumferential image generation unit 30 may generate a bird's eye view image viewed from a virtual viewpoint located above the vehicle 1 as the circumferential image by synthesizing image signals of multiple cameras 10 provided in the vehicle 1.

The circumferential image generated by the circumferential image generation unit 30 is transmitted to the operation device 7 and is displayed in the operation device 7.

Here, the circumferential image to be generated by the circumferential image generation unit 30 will be described.

Figure 3A:
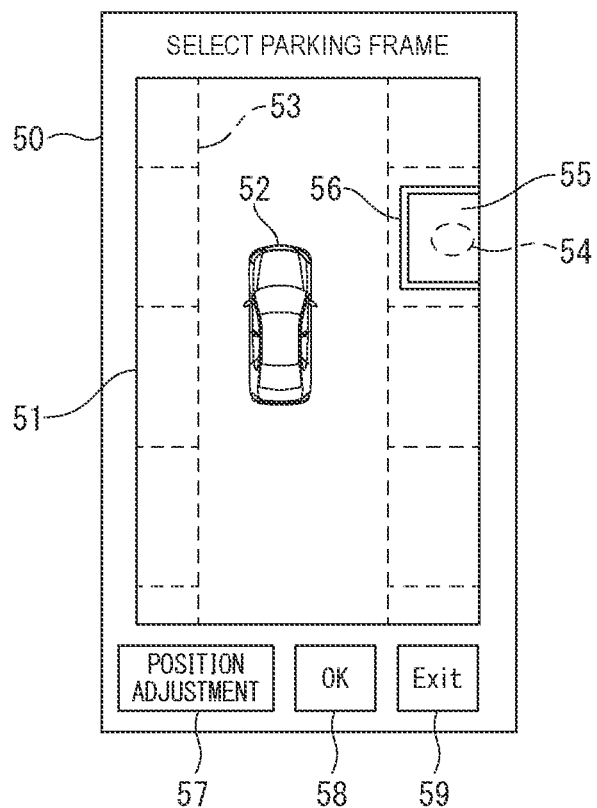
FIG. 3A is a diagram illustrating a first example of a parking frame selection screen.

Refer to FIG. 3A. A reference numeral 50 is a parking frame selection screen to be displayed in the operation device 7. In the parking frame selection screen 50, the operation device 7 receives an operation for selecting a parking frame in which the vehicle 1 is to be parked among one or more parking frames existing in the circumference of the vehicle 1.

The circumferential image generation unit 30 generates a first circumferential image 51 to be displayed on the parking frame selection screen 50. A reference numeral 52 denotes an icon indicating a position of the vehicle 1 in the first circumferential image 51, and a dashed line 53 indicates a separator line on the road surface indicating the parking frames existing in the circumference of the vehicle 1.

In the parking frame selection screen 50, by an operation for specifying any place 54 in a range of a parking frame 55 captured in the first circumferential image 51, the parking frame 55 is selected as the parking frame in which the vehicle 1 is to be parked. For example, the parking frame 55 may be selected by touching a display position of the place 54 on the first circumferential image 51.

When the parking frame in which the vehicle 1 is to be parked is selected, an initial position of the target parking position is set in the selected parking frame. In the first circumferential image 51, a parking position mark 56 indicating a range occupied by the vehicle 1 parked in the target parking position is displayed. The initial position may be set at the center of the parking frame. In this case, the initial position may be set at the center by detecting a width and a depth of the parking frame. In addition, the initial position is not necessarily the center of the parking frame. The initial position may be set to be fitted in the parking frame, and depending on a parking environment, is not necessarily required to be fitted in the parking frame. For example, when an empty space exists outside of the parking frame, the initial position may be set by considering a position where vehicle occupants easily get out of the vehicle.

The initial position of the target parking position is set by the vehicle control circuit 3 on the basis of the circumferential situation detected by the circumferential situation detection sensor group 4. In the operation device 7, the target parking position can be adjusted by moving the parking position mark 56.

By pressing a "position adjustment" button 57, a target parking position adjustment screen for fine-adjusting a position of the parking position mark 56 is displayed in the operation device 7.

Figure 3B:
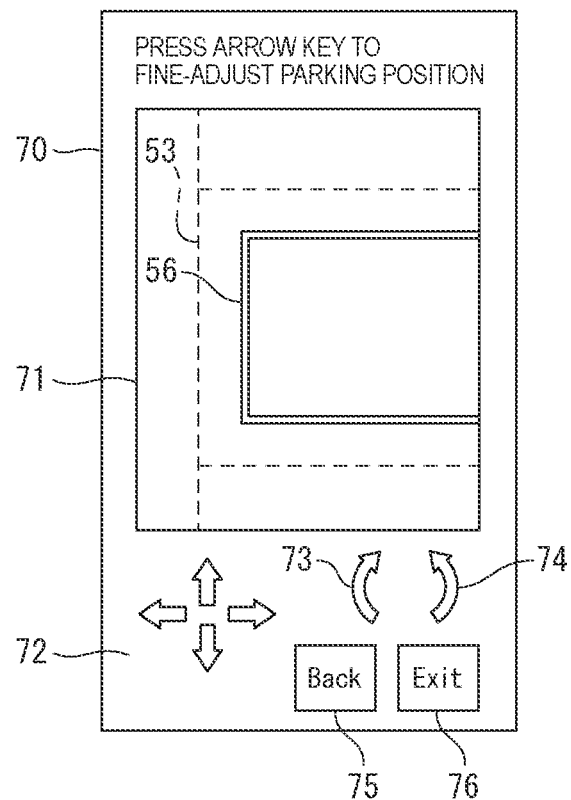
FIG. 3B is a diagram illustrating a first example of a target parking position adjustment screen.

Refer to FIG. 3B. A reference numeral 70 denotes the target parking position adjustment screen. The circumferential image generation unit 30 generates a second circumferential image 71 to be displayed on the target parking position adjustment screen 70.

In order to finely adjust a position of the target parking position, the second circumferential image 71 is set to have higher pixel resolution than that of the first circumferential image 51. Here, the pixel resolution means a visual field width per one pixel, i.e. a size of an object corresponding to one pixel, of the first circumferential image 51 and the second circumferential image 71.

The position of the parking position mark 56 in the second circumferential image 71 can be fine-adjusted by operating a cursor key 72. For example, when operating the cursor key 72, the parking position mark 56 is moved up to a certain amount of movement without scrolling the second circumferential image 71, and, when further continuing to operate the cursor key 72, the second circumferential image 71 may be scrolled.

Furthermore, the parking position mark 56 can be rotated to the right by operating a right rotation key 73, and the parking position mark 56 can be rotated to the left by operating a left rotation key 74.

By pressing a "Back" button 75 after adjusting the position of the parking position mark 56, the parking frame selection screen 50 is returned. At this time, the adjustment performed in the target parking position adjustment screen 70 is reflected in the target parking position, and the target parking position is identified by pressing an "OK" button 58. Subsequently, the automatic driving that parks the vehicle 1 in the target parking position after the adjustment is started.

In contrast, when either of "Exit" buttons 59 and 76 is pressed, the initial position set when selecting the parking frame is identified as the target parking position without performing the adjustment of the target parking position, and the automatic driving that parks the vehicle 1 in the target parking position is started.

Refer to FIG. 2. The circumferential image generation unit 30 outputs the first circumferential image 51 and the second circumferential image 71 to the communication device 6. The communication device 6 transmits the first circumferential image 51 and the second circumferential image 71 to the operation device 7.

The current position estimation unit 31 assumes a current position of the vehicle 1 on the basis of the circumferential situation detected by the circumferential situation detection sensor group 4. The current position estimation unit 31 outputs information of the current position to the following control unit 35.

The start position set unit 32 sets a start position of a parking operation by the automatic driving on the basis of the circumferential situation detected by the circumferential situation detection sensor group 4. The start position set unit 32 outputs information of the start position to the pathway generation unit 34.

The target parking position determination unit 33 detects one or more parking frames existing in the circumference of the vehicle 1 on the basis of the circumferential situation detected by the circumferential situation detection sensor group 4.

The target parking position determination unit 33 receives the instruction signal corresponding to the operation performed by the driver in the operation device 7 via the communication device 6. The target parking position determination unit 33 receives an instruction signal of the selecting operation of the parking frame in the parking frame selection screen 50 from the operation device 7. The target parking position determination unit 33 sets the initial position of the target parking position in the parking frame selected by the driver among the detected parking frames. The target parking position determination unit 33 transmits the initial position of the target parking position to the operation device 7 via the communication device 6. It is to be noted that the target parking position determination unit 33 may be provided in the vehicle or may be provided in the operation device 7. It is to be noted that the target parking position may be determined in response to an operation performed by the operation device or may be set by an interface inside the vehicle, and then, reset by the operation device outside the vehicle.

Furthermore, the target parking position determination unit 33 receives an instruction signal of the adjusting operation of the target parking position in the target parking position adjustment screen 70 from the operation device 7. The target parking position determination unit 33 adjusts the target parking position in response to the instruction signal. The target parking position determination unit 33 informs the operation device 7 that the operation of the operation device 7 is reflected in the target parking position and, in order to update the position of the parking position mark 56 in the target parking position adjustment screen 70, may transmit a reception confirmation signal of the instruction signal to the operation device 7 via the communication device 6. The target parking position determination unit 33 may transmit the target parking position after the adjustment to the operation device 7.

In addition, the target parking position determination unit 33 receives an instruction signal of the pressing operation of the "OK" button 58 or the "Exit" buttons 59 and 76 from the operation device 7. When the "OK" button 58 is pressed, the target parking position determination unit 33 identifies the target parking position and outputs information of the target parking position to the pathway generation unit 34. When the "Exit" button 59 or 76 is pressed, the target parking position determination unit 33 identifies the initial position set when selecting the parking frame as the target parking position and outputs the initial position to the pathway generation unit 34 as information of the target parking position.

The pathway generation unit 34 generates a parking pathway from the start position of the parking operation set by the start position set unit 32 to the target parking position determined by the target parking position determination unit 33. The pathway generation unit 34 outputs information of the generated parking pathway to the following control unit 35 and the target speed set unit 37.

The following control unit 35 calculates a target steering angle of the vehicle 1 such that the current position of the vehicle 1 estimated by the current position estimation unit 31 is located on the parking pathway generated by the pathway generation unit 34. The following control unit 35 outputs information of the calculated target steering angle to the steering control unit 36.

The steering control unit 36 calculates the amount of operation of the steering actuator 12 such that a difference between an actual steering angle of the vehicle 1 and the target steering angle calculated by the following control unit 35 is lowered. The steering control unit 36 outputs the calculated amount of operation to the steering actuator 12.

The target speed set unit 37 calculates a target speed at which the vehicle 1 travels on the parking pathway generated by the pathway generation unit 34. The target speed set unit 37 outputs the calculated target speed to the speed control unit 38.

The speed control unit 38 calculates the amount of operation of the accelerator opening actuator 13 and the brake control actuator 14 such that a difference between a vehicle speed of the vehicle 1 and the target speed calculated by the following control unit 35 is lowered. The speed control unit 38 outputs the calculated amount of operation to the accelerator opening actuator 13 and the brake control actuator 14.

The communication situation determination unit 39 determines a communication situation between the communication device 6 and the operation device 7. For example, the communication situation determination unit 39 may determine a data transfer speed (for example, bit/sec) as the communication situation between the communication device 6 and the operation device 7. In addition, for example, the communication situation determination unit 39 may determine the presence or absence of risk of generating a failure in communication between the communication device 6 and the operation device 7 (hereinafter, referred to as "communication failure risk") as the communication situation.

For example, the communication situation determination unit 39 measures a data transfer speed at each time point, creates a profile of the communication situation, which is a time series of the data transfer speed, and stores the profile of the communication situation in the storage device 16.

The communication situation determination unit 39 reads the profile of the communication situation and calculates a length per unit time of a period in which the communication between the communication device 6 and the operation device 7 is disconnected (hereinafter, referred to as a "communication disconnection time length"). The communication situation determination unit 39 determines that there is the communication failure risk when the communication disconnection time length is longer than a risk determination threshold value. In addition, the communication situation determination unit 39 determines that there is not the communication failure risk when the communication disconnection time length is the risk determination threshold value or less.

Figure 4:
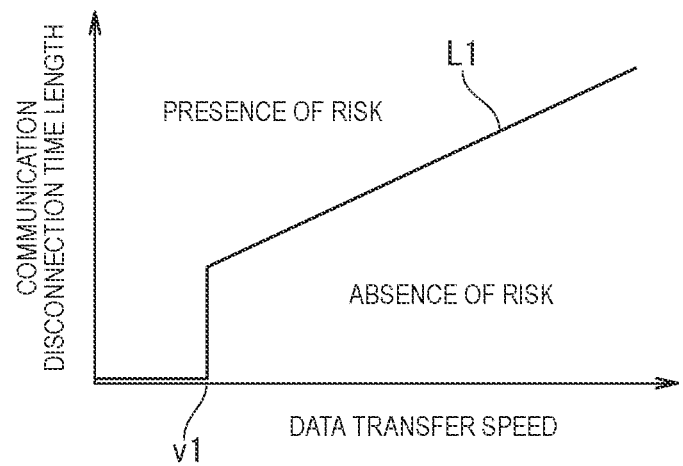
FIG. 4 is an explanatory diagram of a determination method of communication failure risk.

Refer to FIG. 4. The communication situation determination unit 39 may change the risk determination threshold value depending on the data transfer speed. A solid line L1 indicates a function of the data transfer speed for determining the risk determination threshold value.

For example, when the data transfer speed is less than v1, the risk determination threshold value may be zero. More specifically, when the data transfer speed is less than v1, the communication situation determination unit 39 determines that there is the communication failure risk regardless of the data transfer speed.

When the data transfer speed is v1 or more, the risk determination threshold value may be a nonzero fixed value or an increasing function of the data transfer speed.

The communication situation determination unit 39 outputs information of the determined communication situation to the communication device 6. The communication device 6 transmits the information of the communication situation to the operation device 7.

In addition, the communication situation determination unit 39 outputs the information of the determined communication situation to the circumferential image generation unit 30. The circumferential image generation unit 30 may generate the second circumferential image 71 having pixel resolution that differs depending on the communication situation.

For example, when the communication situation is bad, the circumferential image generation unit 30 may decrease the pixel resolution of the second circumferential image 71 to be transmitted to the operation device 7 compared to when the communication situation is good.

For example, the circumferential image generation unit 30 may generate the second circumferential image 71 having pixel resolution R1 when the data transfer speed is a threshold value v2 or more and may generate the second circumferential image 71 having pixel resolution R2 smaller than the pixel resolution R1 when the data transfer speed is less than the threshold value v2.

By decreasing the pixel resolution of the second circumferential image 71, the amount of communication for transmitting the second circumferential image 71 to the operation device 7 can be reduced. Therefore, when the communication situation is bad, transmission delay of the second circumferential image 71 can be reduced.

Thus, for example, for scrolling of the second circumferential image 71 in the target parking position adjustment screen 70 illustrated in FIG. 3B, when the second circumferential image 71 is transmitted in response to the operation in the target parking position adjustment screen 70, stagnation of scrolling due to the transmission delay of the second circumferential image 71 can be relieved.

Next, a configuration of the operation device 7 will be described. Refer to FIG. 1. The operation device 7 includes a controller 20, a communication circuit 21, a display device 22, and an interface 23.

The controller 20 includes a processor 24 and a peripheral component, such as a storage device 25. The processor 24 may be a CPU or a MPU, for example. The storage device 25 may include any of a semiconductor storage device, a magnetic storage device, and an optical storage device. The storage device 25 may include a memory, such as a ROM and a RAM, which is used as a register, a cache memory, or a main storage device. It is to be noted that the controller 20 may be achieved by a functional logic circuit set in a general-purpose semiconductor integrated circuit. For example, the controller 20 may have a PLD, such as a FPGA, or the like.

The communication circuit 21 performs communication with the communication device 6 via a wire or wireless communication line. The communication circuit 21 may perform communication with the communication device 6 via, for example, Near Field Communication, such as Bluetooth (registered trademark), wireless LAN (Local Area Network), such as Wi-Fi (registered trademark), and public wireless communication.

The communication circuit 21 transmits the instruction signal corresponding to the operation performed by the driver in the operation device 7 to the communication device 6. In addition, the communication circuit 21 receives the reception confirmation signal to be transmitted via the communication device 6 in response to the instruction signal. In addition, the communication circuit 21 receives the first circumferential image 51, the second circumferential image 71, information of the initial position of the target parking position, and information of the communication situation from the communication device 6.

The display device 22 functions as a displaying means and displays various pieces of information by control of the controller 20. For example, the parking frame selection screen 50 illustrated in FIG. 3A and the target parking position adjustment screen 70 illustrated in FIG. 3B may be displayed on the display device 22.

The interface 23 functions as an information inputting means and may include an input button, a touch panel provided on a display screen of the display device 22, and the like. The interface 23 is used for receiving the operation by the driver in the operation device 7. For example, the interface 23 receives the operations in the parking frame selection screen 50 and the target parking position adjustment screen 70.

Figure 5:
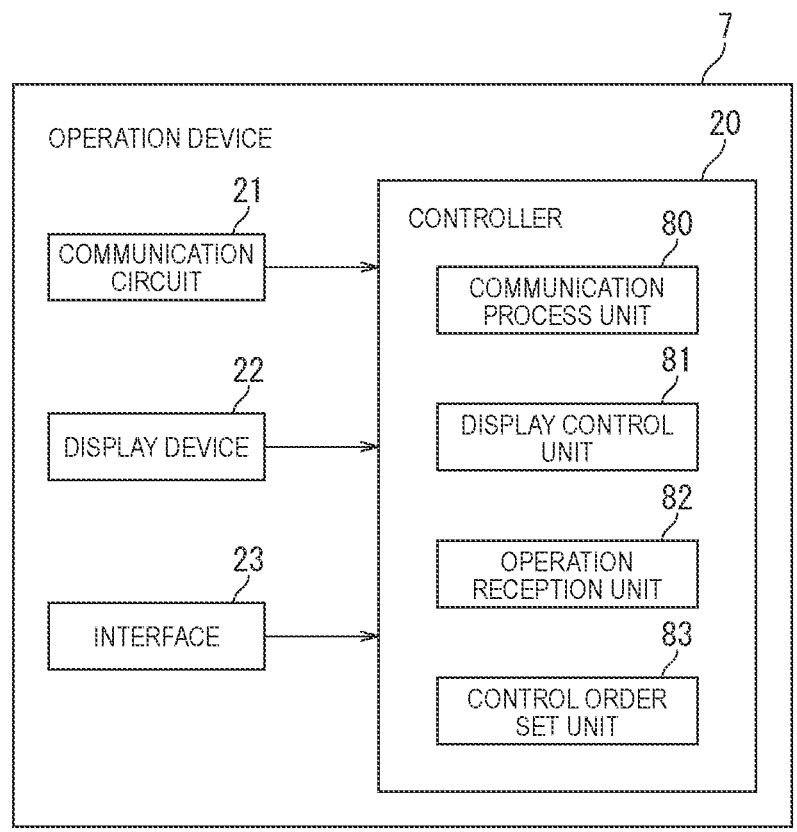
FIG. 5 is a block diagram illustrating an example of a functional configuration of an operation device.

Next, a functional configuration of the operation device 7 will be described with reference to FIG. 5. The controller 20 includes a communication process unit 80, a display control unit 81, an operation reception unit 82, and a control order set unit 83. By executing a computer program stored in the storage device 25, the processor 24 of the controller 20 achieves functions of the communication process unit 80, the display control unit 81, the operation reception unit 82, and the control order set unit 83.

The communication process unit 80 performs a communication process with the vehicle control circuit 3 via the communication line between the communication circuit 21 and the communication device 6. For example, the communication process unit 80 executes processes for transmission of the instruction signal corresponding to the operation performed by the driver, reception of the reception confirmation signal for the instruction signal, and reception of the first circumferential image 51, the second circumferential image 71, the information of the initial position of the target parking position, and the information of the communication situation.

The display control unit 81 performs a process of displaying various screens on the display device 22. For example, the display control unit 81 displays the parking frame selection screen 50 illustrated in FIG. 3A on the display device 22. When the driver pushes the "position adjustment" button 57, the display control unit 81 displays the target parking position adjustment screen 70 illustrated in FIG. 3B on the display device 22.

When the adjusting operation of the position of the parking position mark 56 is performed in the target parking position adjustment screen 70, the display control unit 81 moves the parking position mark 56 in response to the adjusting operation. At this time, the display control unit 81 may update the position of the parking position mark 56 after receiving the reception confirmation signal to be transmitted from the vehicle control circuit 3 for the instruction signal transmitted in response to the adjusting operation.

In addition, the display control unit 81 may scroll the second circumferential image 71 in response to the adjusting operation of the position of the parking position mark 56. At this time, the display control unit 81 may display the second circumferential image 71 after scrolling to be sequentially transmitted from the vehicle control circuit 3 in response to the adjusting operation on the target parking position adjustment screen 70.

The operation reception unit 82 performs a process of receiving the operation performed by the driver with the interface 23.

The control order set unit 83 generates the instruction signal corresponding to the operation performed by the driver. The instruction signal may include, for example, the instruction signal of the adjusting operation of the target parking position, and the instruction signal of the pressing operation of the "OK" button 58 or the "Exit" buttons 59 and 76. The control order set unit 83 outputs the generated instruction signal to the communication circuit 21.

The controller 20 limits the operation in the target parking position adjustment screen 70 depending on the information of the communication situation received from the communication device 6. For example, the controller 20 limits an operation for manually adjusting the target parking position depending on the communication situation.

Accordingly, in a state where arrival of the instruction signal of the adjusting operation of the target parking position at the vehicle control circuit 3 is delayed due to a bad communication situation and the operability of the adjusting operation of the target parking position possibly decreases, the driver can be prohibited in advance from performing the adjusting operation. Thus, the driver is prevented from feeling the decrease in the operability, and a feeling of discomfort due to the decrease in the operability can be prevented.

For example, when the instruction signal of the adjusting operation and the reception confirmation signal thereof are delayed, the update of the parking position mark 56 on the target parking position adjustment screen 70 is delayed. Thus, the driver mistakenly believes that the operation is missed and possibly repeats the operation. Consequently, the parking position mark 56 is moved to an unintended position at a time when the operation is reflected in a delayed fashion, and thus, the driver feels the decrease in the operability.

Therefore, by prohibiting in advance the driver from performing the adjusting operation, the feeling of discomfort generated by performing the adjusting operation is prevented.

For example, when the communication situation does not satisfy a predetermined permission condition, the adjusting operation of the target parking position may be prohibited by prohibiting a transition to the target parking position adjustment screen 70. For example, when it is determined that there is the communication failure risk, the transition to the target parking position adjustment screen 70 may be prohibited. In addition, when the data transfer speed is less than the threshold value, the transition to the target parking position adjustment screen 70 may be prohibited.

Figure 6:
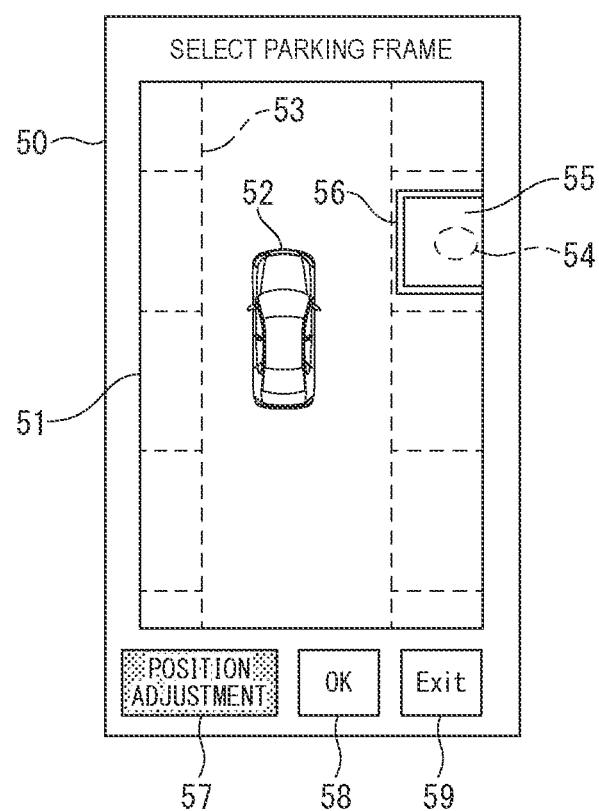
FIG. 6 is a diagram illustrating a second example of the parking frame selection screen.

Refer to FIG. 6. The operation reception unit 82 may prohibit the transition to the target parking position adjustment screen 70 by prohibiting the operation of the "position adjustment" button 57 (more specifically, by disabling the "position adjustment" button 57). At this time, the display control unit 81 generates a display for informing the driver that the transition to the target parking position adjustment screen 70 is prohibited by changing the display of the "position adjustment" button 57 or by stopping the display of the "position adjustment" button 57. More specifically, the display control unit 81 generates a display for informing the driver that the operation for manually adjusting the target parking position is limited.

In addition, the operation reception unit 82 may prohibit the operations of the cursor key 72, the right rotation key 73, and the left rotation key 74. The display control unit 81 may generate a display for informing the driver that the operations of these keys are prohibited.

(Operation)

Figure 7:
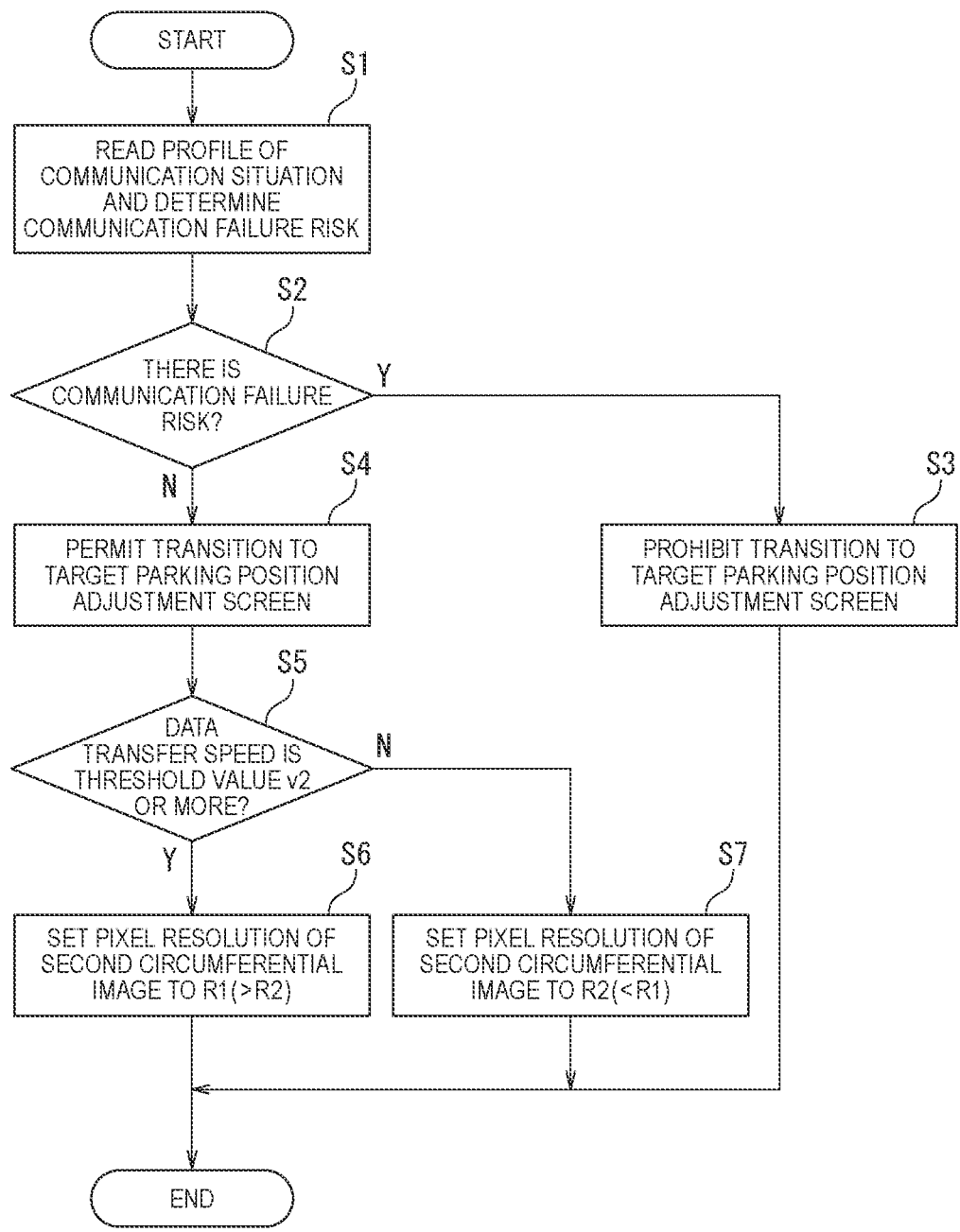
FIG. 7 is a flow chart of an example of a parking assistance method according to a first embodiment.

Next, an example of an assistance method according to the first embodiment will be described. Refer to FIG. 7.

In Step S1, the communication situation determination unit 39 reads the profile of the communication situation and determines whether there is the communication failure risk. When there is the communication failure risk (Step S2: Y), the process proceeds to Step S3. When there is not the communication failure risk (Step S2: N), the process proceeds to Step S4.

In Step S3, the controller 20 prohibits the transition to the target parking position adjustment screen 70. After that, the process is finished.

In Step S4, the controller 20 permits the transition to the target parking position adjustment screen 70.

In Step S5, the circumferential image generation unit 30 determines whether the data transfer speed is the threshold value v2 or more. When the data transfer speed is the threshold value v2 or more (Step S5: Y), the process proceeds to Step S6. When the data transfer speed is less than the threshold value v2 (Step S5: N), the process proceeds to Step S7.

In Step S6, the circumferential image generation unit 30 sets the resolution of the second circumferential image 71 to be transmitted to the operation device 7 to R1 higher than R2. After that, the process is finished.

In Step S7, the circumferential image generation unit 30 sets the resolution of the second circumferential image 71 to be transmitted to the operation device 7 to R2 lower than R1. After that, the process is finished.

Effects of First Embodiment (1) The circumferential situation detection sensor group 4 detects the circumferential situation of the vehicle 1. The target parking position determination unit 33 sets the initial position of the target parking position of the vehicle 1 on the basis of the detected circumferential situation. The communication situation determination unit 39 determines the communication situation between the operation device 7 configured to receive the operation by the operator outside the vehicle 1 and transmit the instruction signal corresponding to the operation and the communication device 6 mounted on the vehicle 1 and configured to receive the instruction signal. The controller 20 limits the operation for manually adjusting the target parking position in the operation device 7 depending on the communication situation. The control order set unit 83 transmits, when the target parking position is adjusted, the instruction signal for moving the target parking position to the communication device 6. The target parking position determination unit 33 moves the target parking position in response to the instruction signal received by the communication device. The vehicle control circuit 3 parks the vehicle 1 in the target parking position by the automatic driving.

Thus, in a state where arrival of the instruction signal of the adjusting operation of the target parking position at the vehicle control circuit 3 is delayed due to a bad communication situation and the operability of the adjusting operation of the target parking position decreases, the driver can be prohibited in advance from performing the adjusting operation having the decreased operability. In this case, the vehicle 1 can be parked in the initial position of the target parking position set on the basis of the circumferential situation of the vehicle 1. Thus, the driver is prevented from feeling the decrease in the operability, and the feeling of discomfort due to the decrease in the operability can be prevented.

(2) In the target parking position adjustment screen 70 for adjusting the target parking position, the target parking position is displayed on the second circumferential image 71 transmitted to the operation device 7 from the communication device 6. Thus, the driver can easily confirm whether the initial position of the target parking position set by the target parking position determination unit 33 is appropriate. In addition, the driver can easily understand the position of the target parking position when fine-adjusting the target parking position depending on the situation.

(3) When the communication situation is bad, the circumferential image generation unit 30 decreases the pixel resolution of the second circumferential image 71 to be transmitted to the operation device 7 from the communication device 6 compared to when the communication situation is good.

By decreasing the pixel resolution of the second circumferential image 71, the amount of communication for transmitting the second circumferential image 71 to the operation device 7 can be reduced. Therefore, when the communication situation is bad, the transmission delay of the second circumferential image 71 can be reduced.

Thus, for example, for scrolling of the second circumferential image 71 in the target parking position adjustment screen 70 illustrated in FIG. 3B, when the second circumferential image 71 is transmitted in response to the operation in the target parking position adjustment screen 70, the stagnation of scrolling due to the transmission delay of the second circumferential image 71 can be relieved.

Therefore, the driver is prevented from feeling the decrease in the operability due to the stagnation of scrolling, and the feeling of discomfort due to the decrease in the operability can be prevented.

Modified Example

The circumferential image generation unit 30 may change the pixel resolution of the second circumferential image 71 to multiple steps of three or more steps depending on the data transfer speed. For example, the pixel resolution of the second circumferential image 71 may be a step function of the data transfer speed, and the step function may have hysteresis.

Figure 8:
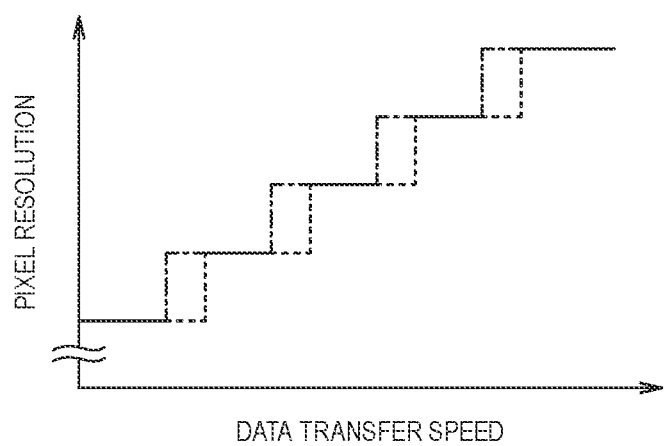
FIG. 8 is an explanatory diagram of a first setting example of pixel resolution of a second circumferential image to be transmitted to the operation device from the vehicle.

Refer to FIG. 8. A dashed line is a step function for determining the pixel resolution of the second circumferential image 71 when the data transfer speed increases, and a dashed-dotted line is a step function for determining the pixel resolution of the second circumferential image 71 when the data transfer speed decreases. By the foregoing hysteresis, the pixel resolution is prevented from fluctuating for a minor increase or decrease of the data transfer speed, and the second circumferential image 71 can be made more visible for the user.

Second Embodiment

Subsequently, the parking assistance device 2 according to a second embodiment will be described. The parking assistance device 2 according to the second embodiment determines a communication situation between the operation device 7 and the communication device 6 at a current located place of the vehicle 1 or the operation device 7. The communication situation is bad depending on a parking environment, and, for example, in a parking structure or a building, an environment surrounded by vehicles, and an environment near a wall or a pole, an operation by an operator is sometimes unsuitable due to interference of a communication electromagnetic wave and a bad communication situation. Thus, the current located place of the vehicle 1 is detected, and at this time, the communication situation at the detected located place, for example, whether the parking environment is a parking structure, and whether a distance from a fixed object, such as a wall or a pole, is a predetermined distance or less, is determined. In this manner, the operation by the operator may be limited. Accordingly, the operation can be reliably limited. In addition, in determining the parking environment, the determination may be performed on the basis of a record of the communication situation determined at the same place in the past. In addition, the communication situation between the operation device 7 and the communication device 6 may be determined on the basis of the communication situation determined by another vehicle using a parking assistance device similar to the parking assistance device 2 at the current located place of the vehicle 1 or the operation device 7.

Thus, even when the communication situation of the current located place of the vehicle 1 or the operation device 7 is changeable or it is difficult to predict a communication situation in the future from the current determination result, the communication situation can be predicted. Hereinafter, in the second embodiment, among modes in which the communication situation is determined by the located place of the vehicle, a mode in which the determination is performed on the basis of the record of the communication situation determined at the same place in the past will be described in detail.

A configuration of the parking assistance device 2 of the second embodiment is similar to the functional configuration illustrated in FIG. 1. When determining the communication situation at the current located place, the communication situation determination unit 39 of the vehicle control circuit 3 stores information of the determined communication situation in the storage device 16 together with the positional information estimated by the current position estimation unit 31. For example, the communication situation determination unit 39 stores the information of the presence or absence of the communication failure risk together with the positional information.

In addition, the communication situation determination unit 39 determines whether the determination result of the communication situation determined in the past at the same place as the current located place is stored in the storage device 16.

When the past determination result is stored in the storage device 16, the communication situation determination unit 39 determines the communication situation at the current located place on the basis of the past determination result.

For example, the communication situation determination unit 39 may calculate a ratio of the number of times when it is determined that there is the communication failure risk to the number of times of the past determination. When the ratio of the number of times when it is determined that there is the communication failure risk is a threshold value A1 or more, it may be determined that the communication situation at the current located place is bad and there is the communication failure risk. However, when the number of times of the past determination is a threshold value B1 or less, the reliability of the determination based on the past determination result is low, and thus, the communication situation determination unit 39 does not determine that there is the communication failure risk.

Figure 9:
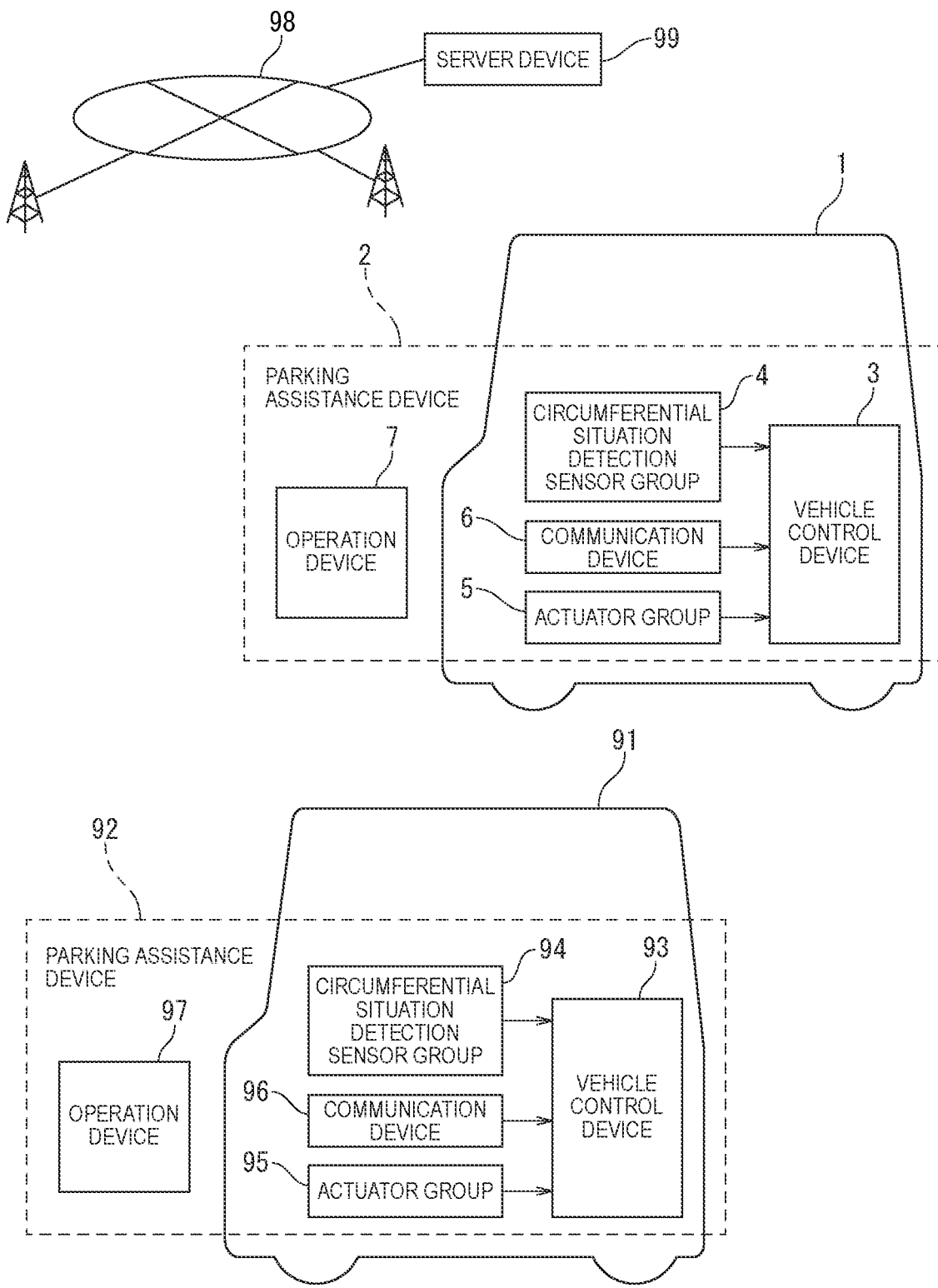
FIG. 9 is an explanatory diagram of the determination method of the communication failure risk in a second embodiment.

Refer to FIG. 9. A reference numeral 92 denotes a parking assistance device similar to the parking assistance device 2. The parking assistance device 92 includes a vehicle control circuit 93, a circumferential situation detection sensor group 94, an actuator group 95, a communication device 96, and an operation device 97. The vehicle control circuit 93 includes a communication situation determination unit similar to the communication situation determination unit 39 and determines a communication situation at a located place of another vehicle 91 or the operation device 97. The communication device 96 transmits the determination result of the communication situation to a server device 99 via a communication network 98. The communication device 96 may directly transmit the determination result to the communication device 6 of the vehicle 1.

The communication device 6 receives the determination result of the communication situation measured in the another vehicle 91 from the server device 99 or the communication device 96.

The communication situation determination unit 39 determines the communication situation at the current located place on the basis of the determination result of the communication situation measured in the another vehicle 91 located at the same place as the current located place. For example, the communication situation determination unit 39 may calculate a ratio of the number of times when it is determined that there is the communication failure risk to the number of times of the determination by the another vehicle 91. When the ratio of the number of times when it is determined that there is the communication failure risk is a threshold value A2 or more, it may be determined that the communication situation at the current located place is bad and there is the communication failure risk. However, when the number of times of the determination by the another vehicle 91 is a threshold value B2 or less, the reliability of the determination based on the past determination result is low, and thus, the communication situation determination unit 39 does not determine that there is the communication failure risk.

Figure 10A:
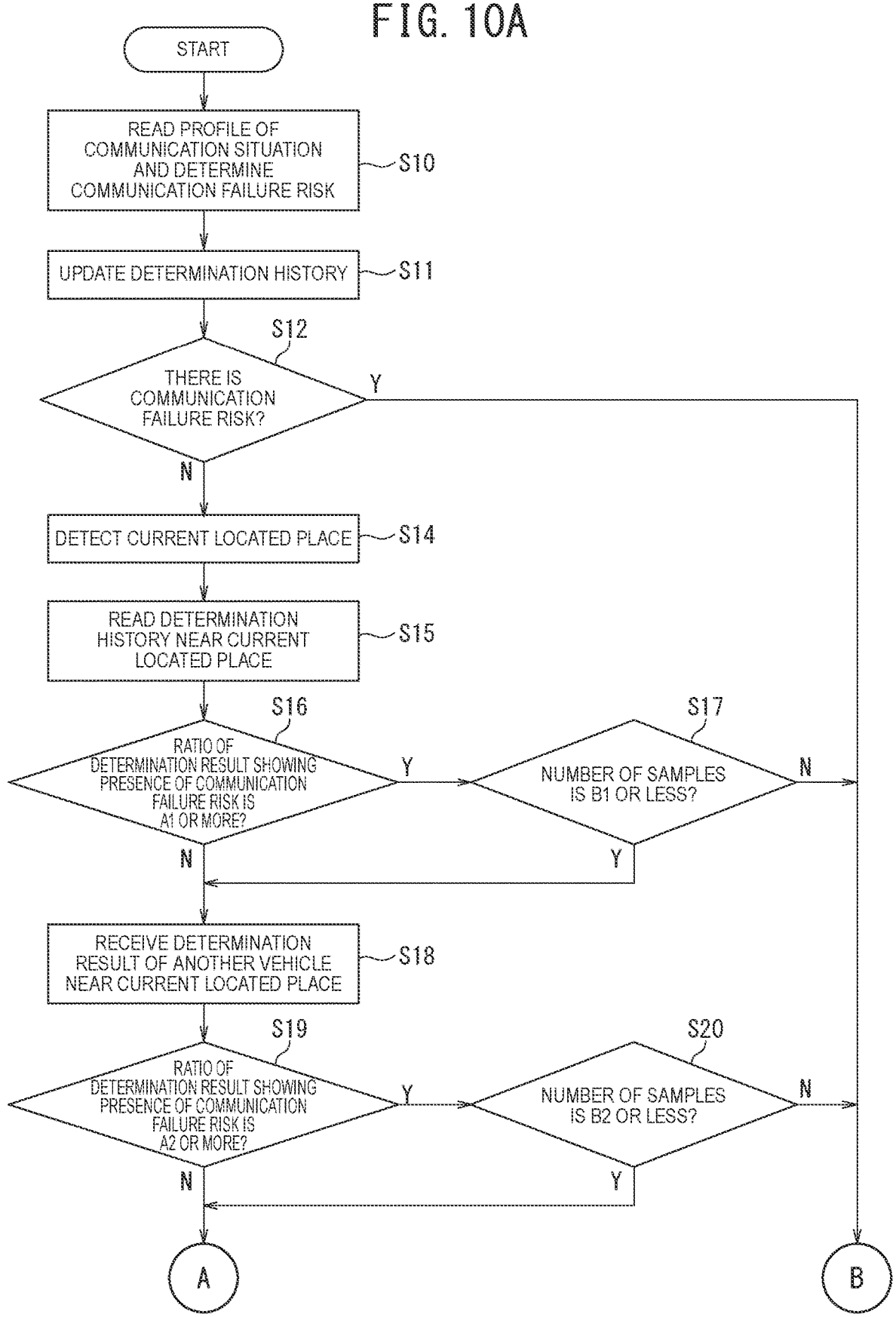
FIG. 10A is a flow chart (part 1) of an example of a parking assistance method according to the second embodiment.
Figure 10B:
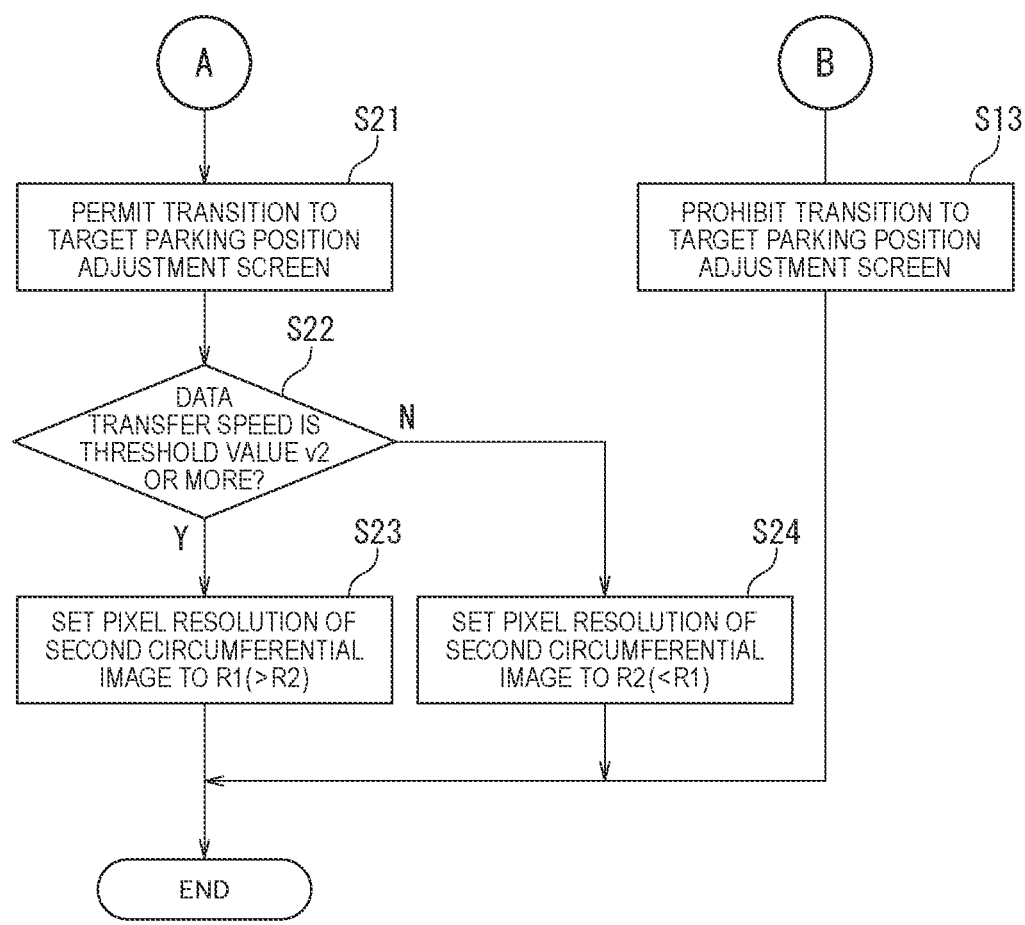
FIG. 10B is a flow chart (part 2) of the example of the parking assistance method according to the second embodiment.

An example of an assistance method according to the second embodiment will be described with reference to FIG. 10A and FIG. 10B. In Step S10, the communication situation determination unit 39 reads the profile of the communication situation and determines whether there is the communication failure risk. In Step S11, the communication situation determination unit 39 stores the information of the presence or absence of the communication failure risk in the storage device 16 together with the positional information.

When there is the communication failure risk (Step S12: Y), the process proceeds to Step S13. When there is not the communication failure risk (Step S12: N), the process proceeds to Step S14.

In Step S13, the controller 20 prohibits the transition to the target parking position adjustment screen 70. After that, the process is finished.

In Step S14, the current position estimation unit 31 detects the current located place of the vehicle 1.

In Step S15, the communication situation determination unit 39 reads a history of the determination result of the communication situation determined in the past in a nearby range of the current located place from the storage device 16. The nearby range may be, for example, a range within a radius of 10 meters centered at the current located place.

In Step S16, the communication situation determination unit 39 determines whether the ratio of the number of times when it is determined that there is the communication failure risk in the past is the threshold value A1 or more. When the ratio of the number of times when it is determined that there is the communication failure risk is the threshold value A1 or more (Step S16: Y), the process proceeds to Step S17. When the ratio of the number of times when it is determined that there is the communication failure risk is less than the threshold value A1 (Step S16: N), the process proceeds to Step S18.

In Step S17, the communication situation determination unit 39 determines whether the number of times of the past determination (i.e. the number of samples) is the threshold value B1 or less. When the number of times of the determination is the threshold value B1 or less (Step S17: Y), the process proceeds to Step S18. When the number of times of the past determination is more than the threshold value B1 (Step S17: N), the process proceeds to Step S13.

In Step S18, the determination result of the communication situation determined by the another vehicle 91 in the nearby range of the current located place is received.

In Step S19, the communication situation determination unit 39 determines whether the ratio of the number of times when it is determined that there is the communication failure risk by the another vehicle 91 is the threshold value A2 or more. When the ratio of the number of times when it is determined that there is the communication failure risk is the threshold value A2 or more (Step S19: Y), the process proceeds to Step S20. When the ratio of the number of times when it is determined that there is the communication failure risk is less than the threshold value A2 (Step S19: N), the process proceeds to Step S21.

In Step S20, the communication situation determination unit 39 determines whether the number of times of the determination by the another vehicle 91 (i.e. the number of samples) is the threshold value B2 or less. When the number of times of the determination by the another vehicle 91 is the threshold value B2 or less (Step S20: Y), the process proceeds to Step S21. When the number of times of the determination by the another vehicle 91 is more than the threshold value B2 (Step S20: N), the process proceeds to Step S13.

The process of Steps S21 to S24 is similar to Steps S4 to S7 of FIG. 7.

Effects of Second Embodiment (1) The current position estimation unit 31 detects the current located place of the vehicle 1. At this time, the communication situation at the detected located place, for example, whether the parking environment is a parking structure, and whether a distance from a fixed object, such as a wall or a pole, is a predetermined distance or less, is determined. Accordingly, the operation by the operator can be reliably limited in an environment where the communication situation is bad. Generally, in the case of a parking structure, or in the case where a distance from a fixed object, such as a wall or a pole, is a predetermined distance or less, the communication situation is bad, and the operation by the operator is unsuitable. In such a case, the operation by the operator can be limited.

(2) The current position estimation unit 31 detects the current located place of the vehicle 1. The communication situation determination unit 39 determines whether the determination result of the communication situation determined in the past at the same place as the detected located place is stored in the storage device 16. When the past determination result is stored in the storage device 16, the communication situation determination unit 39 determines the communication situation at the current located place on the basis of the determination result.

Thus, even when the communication situation of the current located place of the vehicle 1 is changeable and it is difficult to predict a communication situation in the future from the current determination result, the deterioration in the communication situation can be predicted.

(3) The current position estimation unit 31 detects the current located place of the vehicle 1. The communication device 6 receives the determination result of the communication situation determined between the communication device 96 mounted on the another vehicle 91 and the operation device 97 existing outside the another vehicle 91 at the same place as the detected located place from the communication device 96 or the server device 99. The communication situation determination unit 39 determines the communication situation at the current located place on the basis of the determination result.

Thus, even when the communication situation of the current located place of the vehicle 1 is changeable and it is difficult to predict a communication situation in the future from the current determination result, the deterioration in the communication situation can be predicted.

Third Embodiment

Subsequently, the parking assistance device 2 according to a third embodiment will be described. The operation device 7 of the parking assistance device 2 according to the third embodiment changes a display magnification of the second circumferential image 71 displayed on the target parking position adjustment screen 70 illustrated in FIG. 3B in response to the operation by the driver.

Figure 11A:
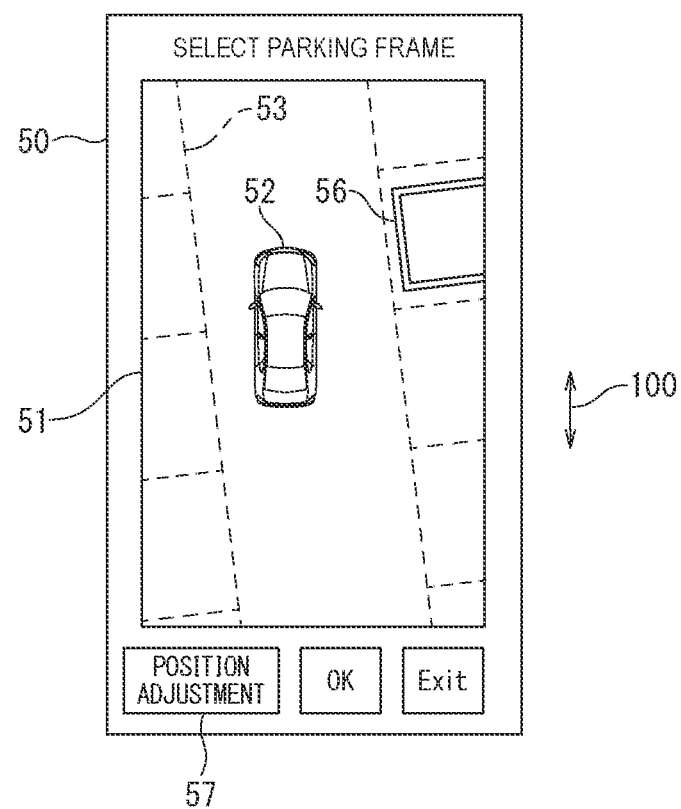
FIG. 11A is a diagram illustrating a third example of the parking frame selection screen.
Figure 11B:
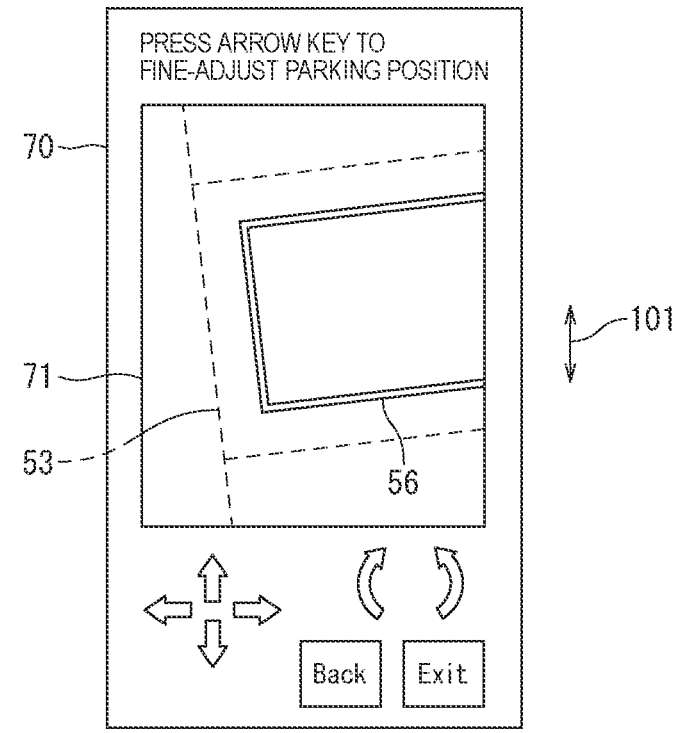
FIG. 11B is a diagram illustrating a second example of the target parking position adjustment screen.
Figure 12A:
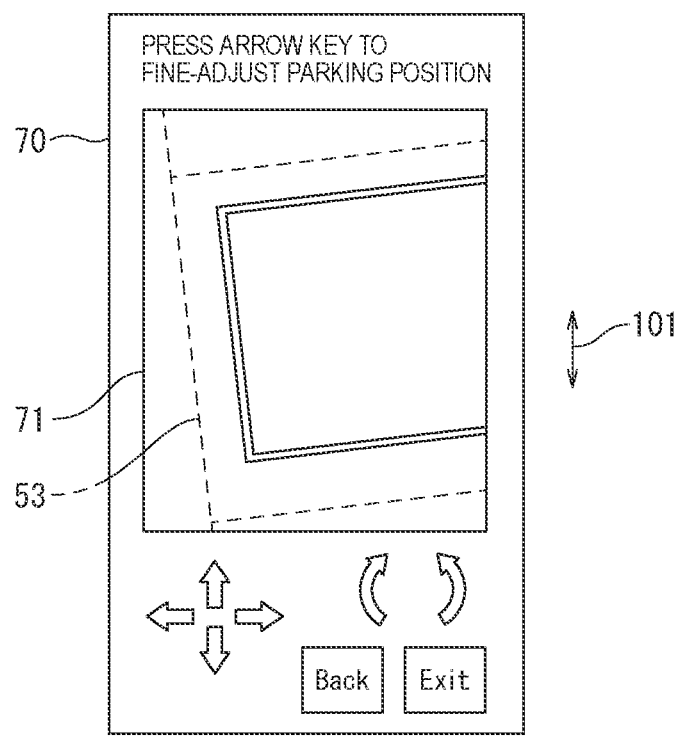
FIG. 12A is a diagram illustrating a third example of the target parking position adjustment screen.

Refer to FIG. 11A, FIG. 11B, and FIG. 12A. When the "position adjustment" button 57 is pressed in the parking frame selection screen 50 illustrated in FIG. 11A, the target parking position adjustment screen 70 illustrated in FIG. 11B is displayed on the operation device 7.

The display magnification of the second circumferential image 71 shortly after transition to the target parking position adjustment screen 70 is set to be an initial magnification D0.

It is to be noted that an arrow 100 indicates a front-rear direction of the vehicle 1 in the first circumferential image 51 illustrated in FIG. 11A, and an arrow 101 indicates the front-rear direction of the vehicle 1 in the second circumferential image 71 illustrated in FIG. 11B.

As illustrated in the drawings, in examples of the first circumferential image 51 illustrated in FIG. 11A and the second circumferential image 71 illustrated in FIG. 11B, the separator lines 53 on the road surface indicating the parking frames are inclined from the front-rear direction and a vehicle width direction of the vehicle 1. Thus, when the front-rear direction of the vehicle 1 is aligned with a lengthwise direction of the first circumferential image 51 and the second circumferential image 71, the separator lines 53 are inclined from the lengthwise direction and a crosswise direction of the first circumferential image 51 and the second circumferential image 71.

When the driver performs the changing operation of the display magnification of the second circumferential image 71 in the target parking position adjustment screen 70, the display magnification of the second circumferential image 71 is changed. The changing operation of the display magnification may be, for example, a pinch-out operation and a pinch-in operation performed on the second circumferential image 71. Alternatively, the display magnification may be changed by operating a button, a wheel, and a jog dial on a GUI provided in the target parking position adjustment screen 70 or physically provided in the operation device 7.

For example, by the operation for increasing the display magnification of the second circumferential image 71, the display magnification of the second circumferential image 71 is increased as illustrated in FIG. 12A.

When the display magnification of the second circumferential image 71 is higher, the visual field width expressed by one pixel of the display device 22 becomes smaller, and thus, a state of the target parking position can be minutely displayed. Thus, when the number of moving pixels of the parking position mark 56 for one-time operation of the cursor key 72 is not changed even when the display magnification is changed, the target parking position can be adjusted more finely.

Here, an angle between a longitudinal direction of the parking position mark 56 and a longitudinal direction of a range of the second circumferential image 71 in the target parking position adjustment screen 70 is smaller, the parking position mark 56 becomes difficult to protrude from the display range of the second circumferential image 71.

Figure 12B:
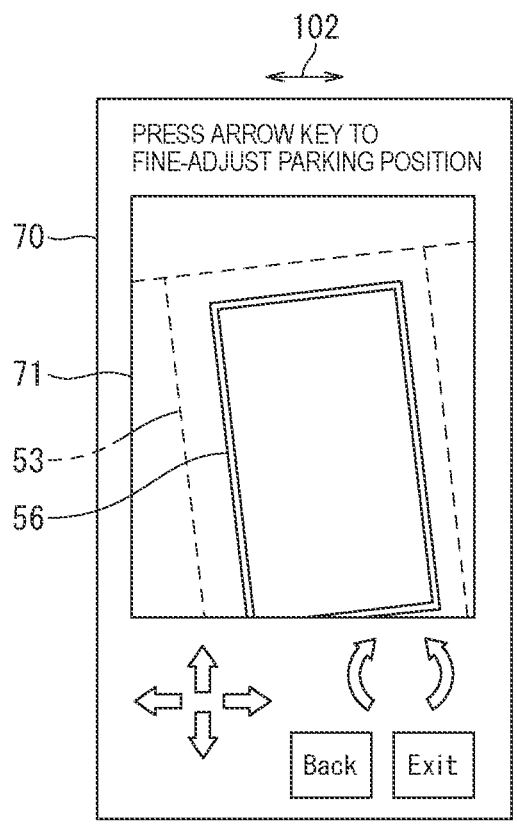
FIG. 12B is a diagram illustrating a fourth example of the target parking position adjustment screen.

Thus, as illustrated in FIG. 12B, the angle between the longitudinal direction of the parking position mark 56 and the longitudinal direction of the display range of the second circumferential image 71 may be decreased by rotating the second circumferential image 71. For example, when the angle between the longitudinal direction of the parking position mark 56 and the longitudinal direction of the display range of the second circumferential image 71 is 45° or more, the second circumferential image 71 may be rotated by 90°.

Here, an arrow 102 indicates the front-rear direction of the vehicle 1. By limiting the rotation angle of the second circumferential image 71 to 90°, the direction of the second circumferential image 71 can be limited such that the front-rear direction of the vehicle 1 becomes one of an up-down direction and a right-left direction. Thus, the driver can easily understand the direction of the vehicle 1 even when the icon 52 of the vehicle 1 is not displayed on the second circumferential image 71.

When the visual field width of one pixel of the second circumferential image 71 becomes larger than the visual field width corresponding to one pixel of the display device 22 due to the increase in the display magnification, multiple pixels of the display device 22 display the same pixel of the second circumferential image 71. Thus, even when the display magnification is increased, the display resolution of the second circumferential image 71 to be displayed on the display device 22 is not increased, and thus, the adjustment accuracy of the target parking position cannot be increased.

In order to prevent the visual field width of one pixel of the second circumferential image 71 from becoming larger than the visual field width corresponding to one pixel of the display device 22 even when the display magnification of the second circumferential image 71 is increased, the second circumferential image 71 having high pixel resolution needs to be transmitted to the operation device 7.

However, the amount of communication is increased by transmitting an image having high pixel resolution, and thus, the transmission delay is generated when the communication situation is bad. When the transmission delay of the second circumferential image 71 is generated, the delay of display of the second circumferential image 71 and the stagnation of scrolling are generated, and the driver feels the decrease in the operability.

Therefore, when the communication situation does not satisfy a predetermined permission condition, the parking assistance device 2 according to the third embodiment prohibits the operation for making the display magnification of the second circumferential image 71 to be displayed on the target parking position adjustment screen 70 larger than the initial magnification D0.

A configuration of the parking assistance device 2 of the third embodiment is similar to the functional configuration illustrated in FIG. 1. The communication situation determination unit 39 of the vehicle control circuit 3 determines whether the communication situation between the communication device 6 and the operation device 7 satisfies the predetermined permission condition. For example, when the data transfer speed is a threshold value C or more, the communication situation determination unit 39 may determine that the predetermined permission condition is satisfied.

The communication situation determination unit 39 outputs information of the determination result to the communication device 6. The communication device 6 transmits the information of the determination result to the operation device 7.

Alternatively, the communication situation determination unit 39 may output information of the communication situation between the communication device 6 and the operation device 7 to the communication device 6, and the communication device 6 may transmit the information of the communication situation to the operation device 7. Then, whether the communication situation satisfies the predetermined permission condition may be determined by the operation reception unit 82 of the operation device 7.

When the communication situation satisfies the predetermined permission condition, the operation reception unit 82 permits the operation for making the display magnification of the second circumferential image 71 larger than the initial magnification D0. In contrast, when the communication situation does not satisfy the predetermined permission condition, the operation reception unit 82 prohibits the operation for making the display magnification of the second circumferential image 71 larger than the initial magnification D0.

When the communication situation satisfies the predetermined permission condition, the circumferential image generation unit 30 of the vehicle control circuit 3 may set the pixel resolution of the second circumferential image 71 to be transmitted to the operation device 7 from the communication device 6 depending on the maximum number of display pixels of the display device 22 of the operation device 7. Refer to FIG. 13. When the maximum number of display pixels of the display device 22 is larger, the circumferential image generation unit 30 may generate the second circumferential image 71 having higher pixel resolution. More specifically, the pixel resolution of the second circumferential image to be transmitted to the operation device 7 from the communication device 6 may be set to be higher as the maximum number of display pixels of the display device 22 is larger.

By setting the pixel resolution of the second circumferential image 71 to be higher as the maximum number of display pixels is larger, the display resolution of the second circumferential image 71 to be displayed on the display device 22 becomes higher in the operation device 7 in which the maximum number of display pixels is larger, and the finer adjustment of the target parking position becomes possible.

When the communication situation satisfies the predetermined permission condition, the display control unit 81 of the operation device 7 decreases the angle between the longitudinal direction of the parking position mark 56 and the longitudinal direction of the display range of the second circumferential image 71 in the target parking position adjustment screen 70 by rotating the second circumferential image 71 as illustrated in FIG. 12B.

Accordingly, the parking position mark 56 becomes difficult to protrude from the display range of the second circumferential image 71 even when the display magnification of the second circumferential image 71 is increased.

Figure 14:
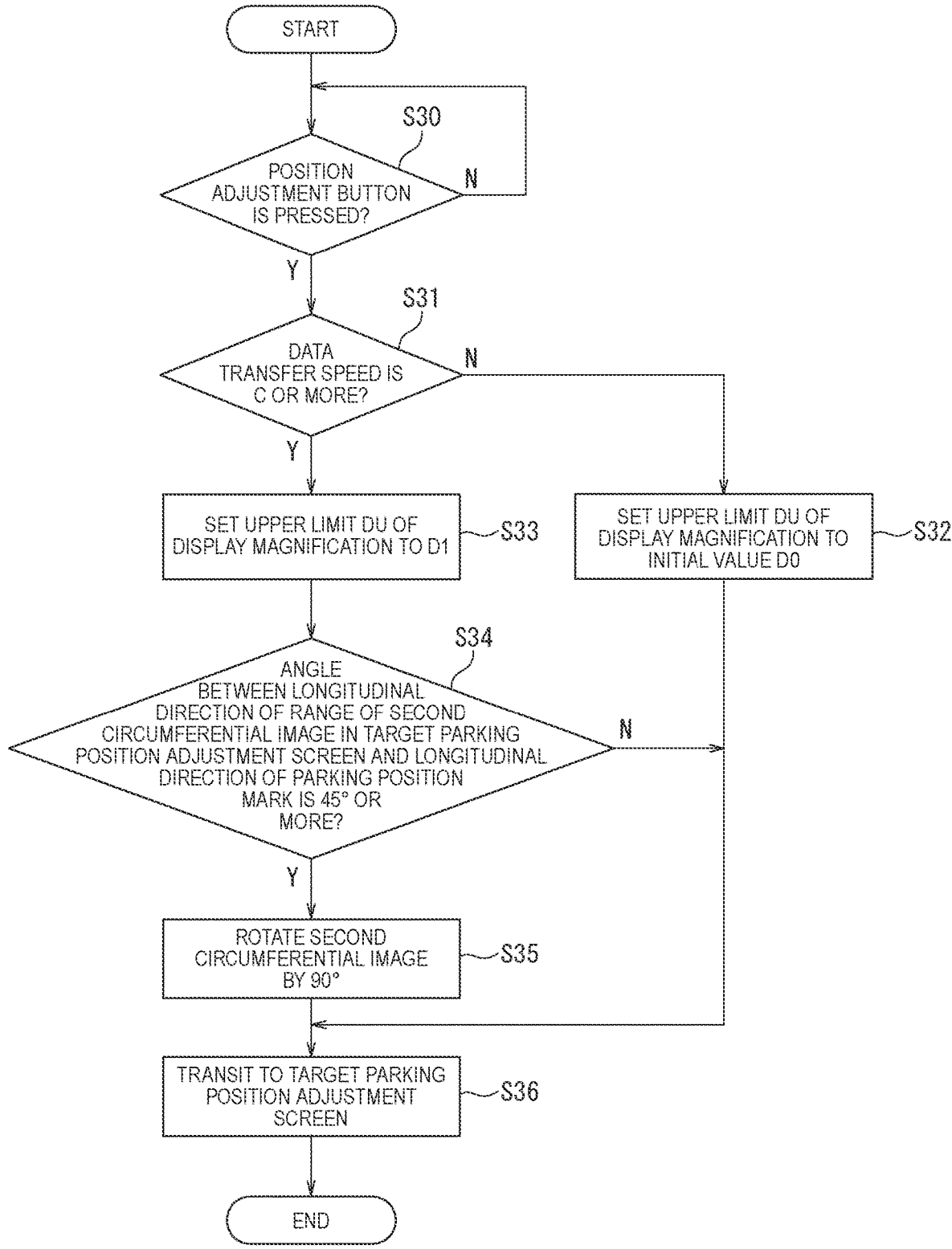
FIG. 14 is an explanatory diagram of an example of a process when a position adjustment button of the parking frame selection screen is pressed.

Next, an example of a process when the "position adjustment" button 57 of the parking frame selection screen 50 is pressed will be described with reference to FIG. 14.

In Step S30, the operation reception unit 82 determines whether the "position adjustment" button 57 is pressed. When the "position adjustment" button 57 is pressed (Step S30: Y), the process proceeds to Step S31. When the "position adjustment" button 57 is not pressed (Step S30: N), the process returns to Step S30.

In Step S31, the operation reception unit 82 determines whether the data transfer speed between the communication device 6 and the operation device 7 is the threshold value C or more. When the data transfer speed is less than the threshold value C (Step S31: N), the process proceeds to Step S32. When the data transfer speed is the threshold value C or more (Step S31: Y), the process proceeds to Step S33.

In Step S32, the operation reception unit 82 sets the upper limit DU of the display magnification of the second circumferential image 71 to the initial value D0. Accordingly, the operation for making the display magnification of the second circumferential image 71 larger than the initial magnification D0 is prohibited. After that, the process proceeds to Step S36.

In Step S33, the operation reception unit 82 sets the upper limit DU of the display magnification of the second circumferential image 71 to D1 larger than the initial value D0. Accordingly, the operation for making the display magnification of the second circumferential image 71 larger than the initial magnification D0 is permitted.

In Step S34, the display control unit 81 determines whether the angle between the longitudinal direction of the range of the second circumferential image 71 in the target parking position adjustment screen 70 and the longitudinal direction of the parking position mark 56 is 45° or more. When the above-described angle is 45° or more (Step S34: Y), the process proceeds to Step S35. When the above-described angle is less than 45° (Step S34: N), the process proceeds to Step S36.

In Step S35, the display control unit 81 decreases the angle between the longitudinal direction of the range of the second circumferential image 71 in the target parking position adjustment screen 70 and the longitudinal direction of the parking position mark 56 by rotating the second circumferential image 71 by 90°. After that, the process proceeds to Step S35.

In Step S36, the display control unit 81 transits a screen to be displayed on the display device 22 to the target parking position adjustment screen 70. After that, the process is finished.

Figure 15:
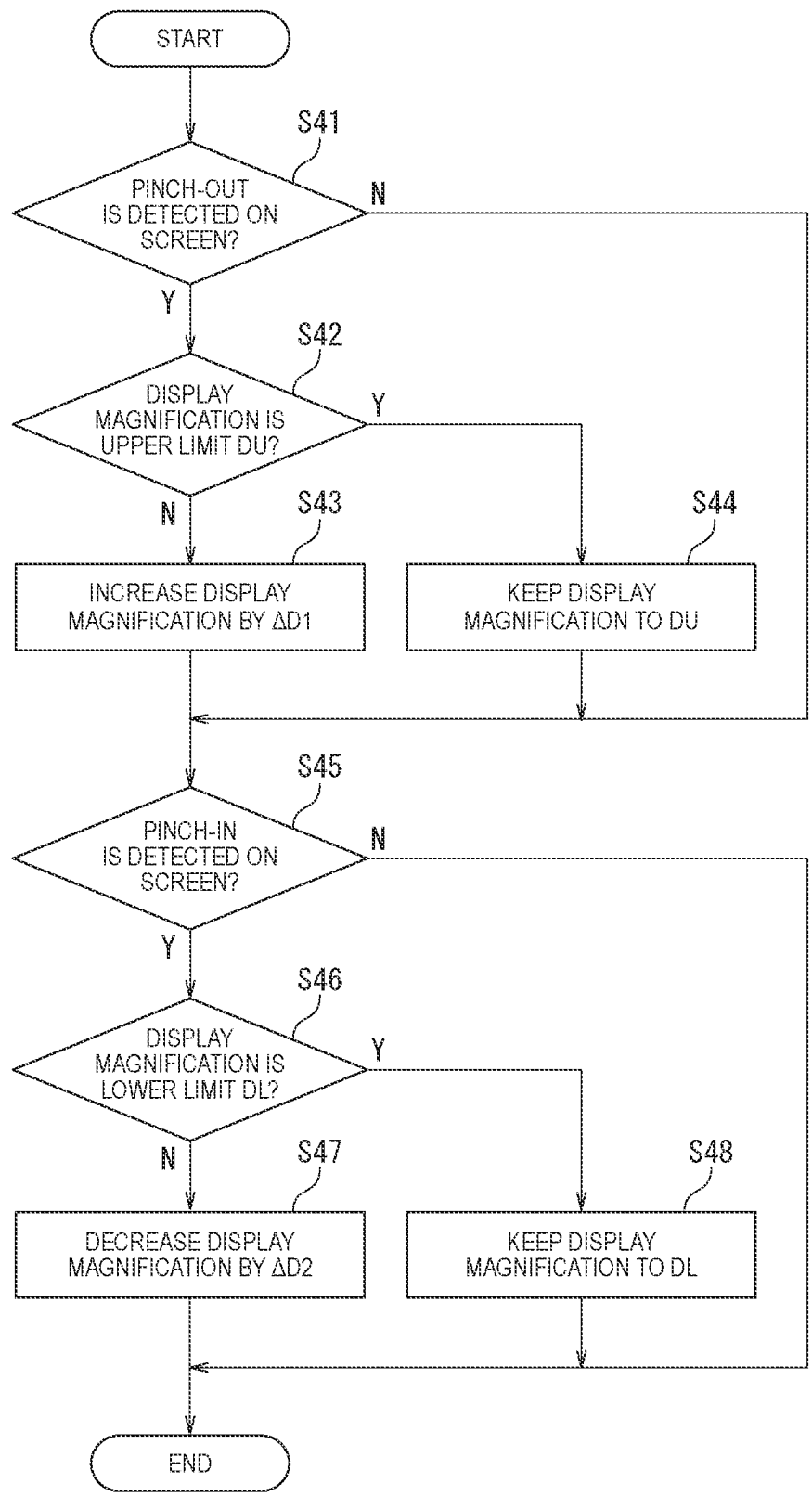
FIG. 15 is an explanatory diagram of an example of a change process of a display magnification of the second circumferential image.

Next, an example of the change process of the display magnification of the second circumferential image 71 will be described with reference to FIG. 15.

In Step S41, the operation reception unit 82 determines whether the pinch-out operation is detected on the second circumferential image 71. When the pinch-out operation is detected (Step S41: Y), the process proceeds to Step S42. When the pinch-out operation is not detected (Step S41: N), the process proceeds to Step S45.

In Step S42, the operation reception unit 82 determines whether the current display magnification of the second circumferential image 71 is the upper limit DU. When the display magnification is the upper limit DU (Step S42: Y), the process proceeds to Step S44. When the display magnification is less than the upper limit DU (Step S42: N), the process proceeds to Step S43.

In Step S43, the display control unit 81 increases the display magnification of the second circumferential image 71 by ΔD1. After that, the process proceeds to Step S45.

In Step S44, the display control unit 81 keeps the display magnification of the second circumferential image 71 to the upper limit DU. After that, the process proceeds to Step S45.

In Step S45, the operation reception unit 82 determines whether the pinch-in operation is detected on the second circumferential image 71. When the pinch-in operation is detected (Step S45: Y), the process proceeds to Step S46. When the pinch-in operation is not detected (Step S45: N), the process is finished.

In Step S46, the operation reception unit 82 determines whether the current display magnification of the second circumferential image 71 is the lower limit DL. When the display magnification is the lower limit DL (Step S46: Y), the process proceeds to Step S48. When the display magnification is more than the lower limit DL (Step S46: N), the process proceeds to Step S47.

In Step S47, the display control unit 81 decreases the display magnification of the second circumferential image 71 by ΔD2. After that, the process is finished.

In Step S48, the display control unit 81 keeps the display magnification of the second circumferential image 71 to the lower limit DL. After that, the process is finished.

Effects of Third Embodiment (1) When the communication situation does not satisfy the predetermined permission condition, the operation reception unit 82 prohibits the operation for increasing the display magnification of the second circumferential image 71 to be displayed on the target parking position adjustment screen 70. Accordingly, the transmission delay generated by transmitting the second circumferential image 71 having high pixel resolution when the communication situation is bad is prevented. Consequently, the decrease in the operability that the driver feels, such as the delay of display of the second circumferential image 71 and the stagnation of scrolling, can be reduced.

(2) When the communication situation satisfies the predetermined permission condition, the circumferential image generation unit 30 sets the pixel resolution of the second circumferential image 71 to be transmitted to the operation device 7 from the communication device 6 to be higher as the maximum number of display pixels of the display device 22 of the operation device 7 is larger. Accordingly, the operation device 7 in which the maximum number of display pixels is larger displays the second circumferential image 71 having higher display resolution, and the finer adjustment of the target parking position becomes possible.

(3) When the communication situation satisfies the predetermined permission condition, the display control unit 81 decreases the angle between the longitudinal direction of the parking position mark 56 and the longitudinal direction of the range of the second circumferential image 71 in the target parking position adjustment screen 70 by rotating the second circumferential image 71 to be displayed on the target parking position adjustment screen 70. Accordingly, the parking position mark 56 becomes difficult to protrude from the display range of the second circumferential image 71 even when the display magnification of the second circumferential image 71 is increased, and thus, the display magnification becomes easy to be increased.

Modified Example

When the communication situation satisfies the predetermined permission condition, the display control unit 81 of the operation device 7 may decrease the angle between the longitudinal direction of the parking position mark 56 and the longitudinal direction of the display range of the second circumferential image 71 by rotating the second circumferential image 71 at an angle other than 90°.

Figure 16:
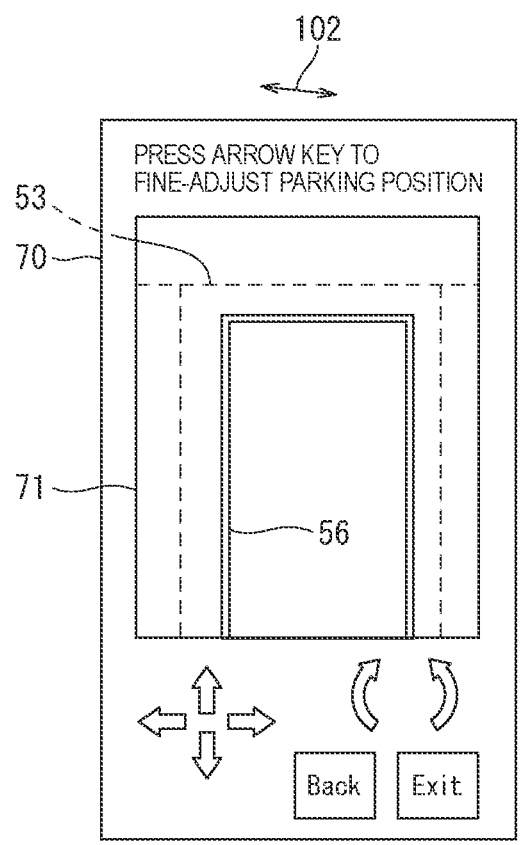
FIG. 16 is a diagram illustrating a fifth example of the target parking position adjustment screen.

Refer to FIG. 16. For example, the display control unit 81 may rotate the second circumferential image 71 such that the longitudinal direction of the parking position mark 56 is parallel to the longitudinal direction of the display range of the second circumferential image 71. Consequently, as indicated by the arrow 102, the front-rear direction of the vehicle 1 is sometimes inclined from the lengthwise direction and the crosswise direction of the second circumferential image 71.

By making the longitudinal direction of the parking position mark 56 be parallel to the longitudinal direction of the display range of the second circumferential image 71, the parking position mark 56 becomes difficult to protrude from the display range of the second circumferential image 71, and thus, the display magnification becomes easier to be increased.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 . . . vehicle, 2 . . . parking assistance device, 3 . . . vehicle control circuit, 4 . . . circumferential situation detection sensor group, 5 . . . actuator group, 6 . . . communication device, 7 . . . operation device, 10 . . . camera, 11 . . . distance measuring sensor, 12 . . . steering actuator, 13 . . . accelerator opening actuator, 14 . . . brake control actuator, 15 . . . processor, 16 . . . storage device, 20 . . . controller, 21 . . . communication circuit, 22 . . . display device, 23 . . . interface, 24 . . . processor, 25 . . . storage device, 30 . . . circumferential image generation unit, 31 . . . current position estimation unit, 32 . . . start position set unit, 33 . . . target parking position determination unit, 34 . . . pathway generation unit, 35 . . . following control unit, 36 . . . steering control unit, 37 . . . target speed set unit, 38 . . . speed control unit, 39 . . . communication situation determination unit, 50 . . . parking frame selection screen, 51 . . . first circumferential image, 56 . . . parking position mark, 70 . . . target parking position adjustment screen, 71 . . . second circumferential image, 80 . . . communication process unit, 81 . . . display control unit, 82 . . . operation reception unit, 83 . . . control order set unit

The invention claimed is:

1. A parking assistance method for receiving an operation by an operator from outside of a vehicle and executing automatic parking in a target parking position, the parking assistance method comprising:
    determining a communication situation between an operation device configured to receive the operation and transmit an instruction signal corresponding to the operation and a communication device mounted on the vehicle and configured to receive the instruction signal;
    limiting the operation for manually adjusting the target parking position in a parking frame in the operation device depending on the communication situation, after receiving the operation for selecting the parking frame in which the vehicle is to be parked, when it is determined that there is communication failure risk in the communication situation; and
    executing automatic parking in the set target parking position.

2. A parking assistance method for receiving an operation by an operator from outside of a vehicle and executing automatic parking in a target parking position, the parking assistance method comprising:
    determining a communication situation between an operation device configured to receive the operation and transmit an instruction signal corresponding to the operation and a communication device mounted on the vehicle and configured to receive the instruction signal;
    limiting the operation for manually adjusting the target parking position in a parking frame in the operation device depending on the communication situation, after receiving the operation for selecting the parking frame in which the vehicle is to be parked, when it is determined that there is communication failure risk in the communication situation; and
    executing automatic parking in the target parking position that is set on the basis of a circumferential situation of the vehicle.

3. The parking assistance method according to claim 1, wherein
    the operation for manually adjusting the target parking position is limited when it is determined that there is the communication failure risk in the communication situation, and the operation for manually adjusting the target parking position is permitted when it is determined that there is not the communication failure risk in the communication situation.

4. The parking assistance method according to claim 1, comprising:
    detecting a current located place of the vehicle or the operation device; and
    determining the communication situation on the basis of the located place.

5. The parking assistance method according to claim 4, comprising:
    determining whether a determination result of the communication situation determined at the same place as the detected located place in a past is stored in a storage device; and, determining a current communication situation at the located place on the basis of the determination result, when the determination result is stored in the storage device.

6. The parking assistance method according to claim 1, comprising:
detecting a current located place of the vehicle or the operation device,
receiving a determination result of a communication situation determined between a second communication device mounted on another vehicle and a second operation device existing outside the another vehicle at the same place as the detected located place from the second communication device or a server device; and
determining the current communication situation at the located place on the basis of the determination result.

7. The parking assistance method according to claim 1, wherein,
in an operation screen of the operation device for adjusting the target parking position, the target parking position is displayed on a circumferential image of the vehicle, which has transmitted to the operation device from the communication device.

8. The parking assistance method according to claim 7, wherein,
when the communication situation is bad, pixel resolution of the circumferential image to be transmitted to the operation device from the communication device is decreased compared to when the communication situation is good.

9. The parking assistance method according to claim 7, wherein,
when the communication situation does not satisfy a predetermined permission condition, an operation for increasing a display magnification of the circumferential image to be displayed on the operation screen is prohibited.

10. The parking assistance method according to claim 7, wherein,
when the communication situation satisfies the predetermined permission condition, the pixel resolution of the circumferential image to be transmitted to the operation device from the communication device is set to be higher as the maximum number of display pixels of a display device of the operation device is larger.

11. The parking assistance method according to claim 7, wherein,
when the communication situation satisfies the predetermined permission condition, an angle between a longitudinal direction of a parking position mark indicating a range occupied by the vehicle at the target parking position in the circumferential image and a longitudinal direction of a range of the circumferential image in the operation screen is decreased by rotating the circumferential image to be displayed on the operation screen.

12. A parking assistance device configured to receive an operation by an operator from outside of a vehicle and execute automatic parking in a target parking position, the parking assistance device comprising:
an operation device configured to receive the operation and transmit an instruction signal corresponding to the operation;
a communication device mounted on the vehicle and configured to receive the instruction signal; and
a controller configured to determine a communication situation between the operation device and the communication device, wherein
the controller limits the operation for manually adjusting the target parking position in a parking frame in the operation device depending on the communication situation, after receiving the operation for selecting the parking frame in which the vehicle is to be parked, when it is determined that there is communication failure risk in the communication situation, and executes automatic parking in the set target parking position.

13. A parking assistance device configured to receive an operation by an operator from outside of a vehicle and execute automatic parking in a target parking position, the parking assistance device comprising:
an operation device configured to receive the operation and transmit an instruction signal corresponding to the operation;
a communication device mounted on the vehicle and configured to receive the instruction signal; and
a controller configured to determine a communication situation between the operation device and the communication device, wherein
the controller limits the operation for manually adjusting the target parking position in parking frame in the operation device depending on the communication situation, after receiving the operation for selecting the parking frame in which the vehicle is to be parked, when it is determined that there is communication failure risk in the communication situation, and executes automatic parking in the target parking position that is set on the basis of a circumferential situation of the vehicle.

* * * * *